US012628155B2

(12) United States Patent     (10) Patent No.:   US 12,628,155 B2

Zhang et al.     (45) Date of Patent:   May 12, 2026

(54) COMMUNICATION METHOD AND APPARATUS

(71) Applicant: HUAWEI TECHNOLOGIES CO., LTD., Shenzhen (CN)

(72) Inventors: Yunhao Zhang, Shanghai (CN); Yinghao Guo, Shanghai (CN); Chaojun Li, Beijing (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/339,746

(22) Filed: Jun. 22, 2023

(65) Prior Publication Data

US 2023/0337223 A1     Oct. 19, 2023

Related U.S. Application Data

(63) Continuation of application No. PCT/CN2020/139553, filed on Dec. 25, 2020.

(51) Int. Cl.
*H04W 72/1263*     (2023.01)
*H04L 5/00*     (2006.01)

(52) U.S. Cl.
CPC ....... *H04W 72/1263* (2013.01); *H04L 5/0051* (2013.01)

(58) Field of Classification Search
None
See application file for complete search history.

(56) References Cited

U.S. PATENT DOCUMENTS

| | | |
|---|---|---|
| 2020/0059964 A1 | 2/2020 | Salem et al. |
| 2020/0221310 A1 | 7/2020 | Babaei et al. |
| 2020/0252823 A1* | 8/2020 | Kim ...................... H04W 48/16 |
| 2021/0243777 A1* | 8/2021 | Tsai ................... H04W 74/006 |

(Continued)

FOREIGN PATENT DOCUMENTS

| | | |
|---|---|---|
| CN | 111050400 A | 4/2020 |
| CN | 111800887 A | 10/2020 |

(Continued)

OTHER PUBLICATIONS

Vivo, "Enhancements for unlicensed band URLLC/IIoT," 3GPP TSG RAN WG1#103-e, R1-2007657, e-Meeting, Oct. 26-Nov. 13, 2020; 8 total pages.

(Continued)

*Primary Examiner* — Otis L Thompson, Jr.
(74) *Attorney, Agent, or Firm* — Rimon PC

(57) ABSTRACT

This application discloses a communication method and apparatus. In the method, a terminal device receives first configuration information from an access network device, where the first configuration information is for configuring M configured grant (CG) resources to correspond N downlink reference signals. The M CG resources are used by the terminal device to send uplink information when the terminal device is in a non-connected state. The terminal device then receives first reconfiguration information from the access network device after the terminal device enters the non-connected state, where the first reconfiguration information is for updating downlink reference signals corresponding to some or all of the M CG resources.

20 Claims, 12 Drawing Sheets

(56) References Cited

U.S. PATENT DOCUMENTS

| | | | | |
|---|---|---|---|---|
| 2021/0410181 A1* | 12/2021 | Jeon | | H04W 52/0258 |
| 2022/0046661 A1* | 2/2022 | Jeon | | H04W 72/23 |

FOREIGN PATENT DOCUMENTS

| | | |
|---|---|---|
| WO | 2020033895 A1 | 2/2020 |
| WO | 2020067776 A1 | 4/2020 |
| WO | 2020228428 A1 | 11/2020 |

OTHER PUBLICATIONS

3GPP TS 38.331 v16.2.0 (Sep. 2020), 3rd Generation Partnership Project; Technical Specification Group Radio Access Network; NR; Radio Resource Control (RRC) protocol specification (Release 16); 921 total pages.

Huawei, HiSilicon, Discussion on CG-based scheme [online], 3GPP TSG RAN WG2 #112-e R2-2010281, Internet URL:https://www.3gpp.org/ftp/tsg_ran/WG2_RL2/TSGR2_112-e/Docs/R2-2010281.zip>, Oct. 23, 2020, total 17 pages.

Oppo, Discussion on CG-based SDT [online], 3GPP TSG RAN WG2 #112-e R2-2009015, Internet URL:https://www.3gpp.org/ftp/tsg_ran/WG2_RL2/TSGR2_112-e/Docs/R2-2009015.zip>, Oct. 23, 2020, total 4 pages.

Mediatek Inc., CG-based SDT [online], 3GPP TSG RAN WG2 #112-e R2-2009057, Internet URL: https://www.3gpp.org/ftp/tsg_ran/WG2_RL2/TSGR2_112-e/Docs/R2-2009057.zip>, Oct. 23, 2020, total 5 pages.

Session Chair (InterDigital), Report for Rel-16 (NR-U, Power Savings and 2-step RACH) and IIoT and Small Data [online], 3GPP TSG RAN WG2 #112-e R2-2010704, Internet URL:https://www.3gpp.org/ftp/tsg_ran/WG2_RL2/TSGR2_112-e/Docs/R2-2010704.zip>, Nov. 16, 2020, total 27 pages.

Huawei, HiSilicon, RA and CG based small data transmission [online], 3GPP TSG RAN WG1 #104-e R1-2101267, Internet URL:https://www.3gpp.org/ftp/tsg_ran/WG1_RL1/TSGR1_104-e/Docs/R1-2101267.zip>, Jan. 19, 2021, total 7 pages.

* cited by examiner (a)

(b)

SSB1: Transmit beam 1

SSB2:Transmit beam 2

SSB3: Transmit beam 3

SSB4: Transmit beam 4

Receive beam 1'     Receive beam 2'     Receive beam 3'

SSB1     SSB2     SSB3     SSB4

First set of CG resources

Second set of CG resources

Third set of CG resources

| | SSB1 | SSB2 | SSB3 | SSB4 |
|---|---|---|---|---|
| First set of CG resources | Periodicity i | Periodicity i+1 | Periodicity i+2 | |
| Second set of CG resources | Periodicity j and periodicity j+1 | Periodicity j+2 | Periodicity j+3 | |

| | SSB1 | SSB2 | SSB3 | SSB4 |
|---|---|---|---|---|
| First set of CG resources | First CG resource | Second CG resource | Third CG resource | |

Periodicity 1

1600

COMMUNICATION METHOD AND APPARATUS

CROSS-REFERENCE TO RELATED APPLICATIONS

This application is a continuation of International Application No. PCT/CN2020/139553, filed on Dec. 25, 2020, the disclosure of which is hereby incorporated by reference in its entirety.

TECHNICAL FIELD

This application relates to the field of wireless communication technologies, and in particular, to a communication method and apparatus.

BACKGROUND

In a fifth generation (5G) communication system, a terminal device has three radio resource control (RRC) states: an RRC-connected (RRC-connected) state, an RRC-idle state, and an RRC-inactive state. The terminal device in the RRC-connected state may perform data transmission with an access network device. However, when the terminal device in the RRC-inactive state (or the RRC-idle state) intends to perform data transmission with the access network device, the terminal device needs to first complete multiple information exchanges to enter the connected state. In other words, the terminal device in the RRC-inactive state needs to first enter the RRC-connected state, and then performs data transmission with the access network device.

To reduce power consumption by a terminal device in the RRC-inactive state, a solution for a small data transmission scenario is currently provided. To be specific, the terminal device may send uplink data to the access network device when the terminal device is in the RRC-inactive state, and does not need to enter the RRC-connected state first before sending the uplink data. However, for the solution for the small data transmission scenario, further research is still required, to improve the performance of the access network device when receiving small data.

SUMMARY

This application provides a communication method and apparatus, to improve receiving performance of an access network device receiving uplink data sent by a terminal device on a configured grant (CG) resource.

According to a first aspect, an embodiment of this application provides a communication method. The method is used to implement a function on a terminal device side. For example, the method may be applied to a terminal device or a chip in a terminal device. Embodiments of this application do not limit a specific execution body of the method. By using example in which the method is applied to a terminal device, in the method, the terminal device receives first configuration information from an access network device, where the first configuration information is for configuring M CG resources to correspond N downlink reference signals. Optionally, when the terminal device is in a non-connected state, the terminal device may send uplink information on a CG resource based on the first configuration information. The uplink information may be information carried on a physical uplink shared channel (PUSCH) and/or a physical uplink control channel (PUCCH).

In the foregoing manner, the access network device may configure, for the terminal device, that the M CG resources correspond to the N downlink reference signals. Therefore, when the terminal device sends uplink data (for example, small data) on a CG resource corresponding to a downlink reference signal, the access network device may receive the uplink data on the CG resource by using a corresponding receive beam, so that the receiving performance of the access network device receiving the uplink data can be effectively improved.

In a possible design, the terminal device may further receive first reconfiguration information from the access network device after the terminal device enters the non-connected state, where the first reconfiguration information is for updating downlink reference signals corresponding to some or all of the M CG resources. M and N are positive integers. Optionally, the first reconfiguration information may be carried in downlink control information (DCI), a media access control control element (MAC CE), or a radio resource control (RRC) message. Alternatively, the first reconfiguration information may also be carried in a message transmitted in a random access process, for example, a MsgB in a two-step random access process, or a Msg2 or a Msg4 in a four-step random access process.

In the foregoing manner, the access network device may send first reconfiguration information to the terminal device, to update a correspondence between a CG resource and a downlink reference signal. In this way, when the terminal device moves in an RRC-non-connected state, the correspondence between the CG resource and the downlink reference signal can be adjusted in a timely and flexible manner, so that after selecting a current downlink reference signal, the terminal device can have more CG resources for sending uplink data, to ensure data transmission of the terminal device in the RRC-non-connected state.

In a possible design, when the first reconfiguration information is carried in the DCI, the DCI may further include second information, and the second information includes hybrid automatic repeat request (HARQ) feedback information and/or scheduling information; and the HARQ feedback information indicates whether the uplink data of the terminal device is successfully received, and the scheduling information is for scheduling a physical uplink shared channel (PUSCH) or a physical downlink shared channel (PDSCH) of the terminal device. Optionally, the uplink information includes the foregoing uplink data.

In a possible design, that the M CG resources correspond to N downlink reference signals includes at least one of the following: the M CG resources belong to one or more sets of CG resources, each CG resource belongs to one of the sets of CG resources, and each set of CG resources corresponds to one or more downlink reference signals in the N downlink reference signals; the M CG resources are in one or more periodicities, each CG resource is in one of the periodicities, and each periodicity corresponds to one or more downlink reference signals in the N downlink reference signals; and one or more CG resources in the M CG resources correspond to one or more downlink reference signals in the at least one downlink reference signals.

In the foregoing manner, when the access network device configures the M CG resources to correspond to the N downlink reference signals, the access network device may configure the correspondence based on a plurality of possible granularities (for example, configure the CG resources based on granularities such as a "set", a "periodicity", and a "quantity"), so that the correspondence is flexible, and further, the terminal device also has high flexibility in selecting a CG resource, thereby facilitating data transmission in RRC non-connection state.

In a possible design, the M CG resources belong to W sets of CG resources, the W sets of CG resources include a first set of CG resources, and the first configuration information includes at least one of the following: a type of a downlink reference signal corresponding to the first set of CG resources, an identifier of the downlink reference signal corresponding to the first set of CG resources, and a measurement threshold (for example, a first threshold) of the downlink reference signal. When a measurement value of a downlink reference signal is greater than or equal to the first threshold, the terminal device may send the uplink data by using a CG resource corresponding to the downlink reference signal.

In a possible design, the method further includes: receiving P downlink reference signals from the access network device, where the P downlink reference signals include the N downlink reference signals, P is a positive integer, and P is greater than or equal to N; and then sending first information to the access network device based on measurement values of the P downlink reference signals. Herein, the first information may be for requesting to update the correspondence between the CG resource and the downlink reference signal.

In the foregoing manner, the terminal device may actively request the access network device to update the correspondence between the CG resource and the downlink reference signal. For example, after receiving the first information, the access network device may update the correspondence based on the first information. If the first information is not received, the access network device does not temporarily update the correspondence.

In a possible design, the N downlink reference signals include a first downlink reference signal; and the method further includes: sending the first information to the access network device on a CG resource corresponding to the first downlink reference signal.

In a possible design, the method further includes: sending uplink data to the access network device on the CG resource corresponding to the first downlink reference signal.

In the foregoing manner, the terminal device may send the first information and the uplink data together on the CG resource corresponding to the first downlink reference signal, so that the CG resource can be more fully utilized.

In a possible design, before the sending of the first information to the access network device on a CG resource corresponding to the first downlink reference signal, the method further includes: selecting the first downlink reference signal from the N downlink reference signals based on measurement values of the N downlink reference signals, where a measurement value of the first downlink reference signal is greater than or equal to a first threshold; or a measurement value of the first downlink reference signal is greater than or equal to measurement values of other downlink reference signals in the N downlink reference signals.

In a possible design, the P downlink reference signals include a second downlink reference signal, and a measurement value of the second downlink reference signal is greater than the measurement value of the first downlink reference signal; and the first information includes the measurement value of the first downlink reference signal and the measurement value of the second downlink reference signal; or the first information includes an index of the second downlink reference signal; or the first information includes measurement values of the P downlink reference signals.

In a possible design, the M CG resources include a first CG resource, and the first configuration information is for configuring the first CG resource and configuring the first CG resource to correspond to the first downlink reference signal; and the first reconfiguration information is for configuring the first CG resource to correspond to the second downlink reference signal.

In a possible design, the M CG resources further include a second CG resource, and the first configuration information is for configuring the second CG resource and configuring the second CG resource to correspond to the second downlink reference signal; and the first reconfiguration information is further for configuring the second CG resource to correspond to the first downlink reference signal.

In a possible design, the P downlink reference signals include a third downlink reference signal; the method further includes: initiating a random access process based on a random access resource corresponding to the third downlink reference signal; and the first information is carried in a first message, and the first message is used in the random access process.

In a possible design, the M CG resources include a third CG resource, and the first configuration information is for configuring the third CG resource and configuring the third CG resource to correspond to a fourth downlink reference signal; and the first reconfiguration information is for configuring the third CG resource to correspond to the third downlink reference signal.

In a possible design, the M CG resources further include a fourth CG resource, and the first configuration information is for configuring the fourth CG resource and configuring the fourth CG resource to correspond to the third downlink reference signal; and the first reconfiguration information is further for configuring the fourth CG resource to correspond to the fourth downlink reference signal.

In a possible design, the M CG resources further include a fifth CG resource, a HARQ process identifier corresponding to the fifth CG resource is obtained based on a first offset, and the first offset is determined based on a downlink reference signal corresponding to the fifth CG resource.

In the foregoing manner, because a HARQ process identifier corresponding to a CG resource is related to a downlink reference signal corresponding to the CG resource, thereby increasing a quantity of CG resources corresponding to a specific HARQ process identifier, that is, increasing a selection opportunity of the terminal device, and reducing a transmission delay of the uplink data.

In a possible design, the method further includes: receiving second configuration information from the access network device, where the second configuration information is for configuring a maximum quantity of times of retransmission of a HARQ process corresponding to the HARQ process identifier and/or a valid duration of the HARQ process corresponding to the HARQ process identifier.

In the foregoing manner, a resource waste caused by the terminal device performing excessive retransmission in the HARQ process corresponding to the HARQ process identifier can be effectively avoided.

According to a second aspect, an embodiment of this application provides a communication method. The method is used to implement a function on an access network device side. For example, the method may be applied to an access network device or a chip in an access network device. Embodiments of this application do not limit a specific execution body of the method. By using an example in which the method is applied to an access network device, in the method, the access network device sends first configuration information to a terminal device, where the first configuration information is for configuring M configured grant (CG) resources to correspond N downlink reference signals, and the M CG resources are for receiving uplink information from the terminal device when the terminal device is in a non-connected state; and after the terminal device enters the non-connected state, the access network device may receive uplink information on a CG resource based on the first configuration information.

In a possible design, the access network device may send first reconfiguration information to the terminal device when the terminal device is in the non-connected state, where the first reconfiguration information is for updating downlink reference signals corresponding to some or all of the M CG resources, where M and N are positive integers.

For description for that the M configured grant (CG) resources correspond to the N downlink reference signals, description for the first reconfiguration information, and the like, refer to the first aspect. Details are not described herein again.

In a possible design, the sending of the first reconfiguration information to the terminal device includes: receiving first information from the terminal device; and sending the first reconfiguration information to the terminal device based on the first information.

In a possible design, the N downlink reference signals include a first downlink reference signal; and the method further includes: receiving the first information from the terminal device on a CG resource corresponding to the first downlink reference signal.

In a possible design, the method further includes: receiving uplink data from the terminal device on the CG resource corresponding to the first downlink reference signal.

In a possible design, a measurement value of the first downlink reference signal is greater than or equal to a first threshold; or a measurement value of the first downlink reference signal is greater than or equal to measurement values of other downlink reference signals in the N downlink reference signals.

In a possible design, the method further includes: sending P downlink reference signals, where the P downlink reference signals include the N downlink reference signals, P is a positive integer, and P is greater than or equal to N; the P downlink reference signals include a second downlink reference signal; and the first information includes the measurement value of the first downlink reference signal and a measurement value of the second downlink reference signal, and the measurement value of the second downlink reference signal is greater than the measurement value of the first downlink reference signal; or the first information includes an index of the second downlink reference signal; or the first information includes measurement values of the P downlink reference signals.

In a possible design, the M CG resources include a first CG resource, and the first configuration information is for configuring the first CG resource and configuring the first CG resource to correspond to the first downlink reference signal; and the first reconfiguration information is for configuring the first CG resource to correspond to the second downlink reference signal.

In a possible design, the M CG resources further include a second CG resource, and the first configuration information is for configuring the second CG resource and configuring the second CG resource to correspond to the second downlink reference signal; and the first reconfiguration information is used further for configuring the second CG resource to correspond to the first downlink reference signal.

In a possible design, the method further includes: sending P downlink reference signals, where the P downlink reference signals include the N downlink reference signals, P is a positive integer, and P is greater than or equal to N; the P downlink reference signals include a third downlink reference signal; and the first information is carried in a first message, the first message is used in a random access process, and a resource for carrying the first message is a random access resource corresponding to the third downlink reference signal.

In a possible design, the M CG resources include a third CG resource, and the first configuration information is for configuring the third CG resource and configuring the third CG resource to correspond to a fourth downlink reference signal; and the first reconfiguration information is for configuring the third CG resource to correspond to the third downlink reference signal.

In a possible design, the M CG resources further include a fourth CG resource, and the first configuration information is for configuring the fourth CG resource and configuring the fourth CG resource to correspond to the third downlink reference signal; and the first reconfiguration information is used further for configuring the fourth CG resource to correspond to the fourth downlink reference signal.

In a possible design, the M CG resources further include a fifth CG resource, a HARQ process identifier corresponding to the fifth CG resource is obtained based on a first offset, and the first offset is determined based on a downlink reference signal corresponding to the fifth CG resource.

In a possible design, the method further includes: sending second configuration information to the terminal device, where the second configuration information is for configuring a maximum quantity of times of retransmission of a HARQ process corresponding to the HARQ process identifier and/or a valid duration of the HARQ process corresponding to the HARQ process identifier.

It should be noted that, the method described in the second aspect corresponds to the method described in the first aspect. For beneficial effects of related technical features in the method described in the second aspect, refer to the description in the first aspect. Details are not described again.

According to a third aspect, an embodiment of this application provides a communication apparatus. The communication apparatus may be a terminal device or a chip that can be disposed inside the terminal device. The communication apparatus implements the first aspect. For example, the communication apparatus includes a corresponding module, unit, or means for performing the steps in the first aspect. The function, unit, or means may be implemented by software or hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive configuration information from an access network device. The processing unit may be configured to perform some internal operations of the communication apparatus. Functions performed by the processing unit and the communication unit may correspond to the operations in the first aspect.

In a possible design, the communication apparatus includes a processor, and may further include a transceiver. The transceiver is configured to receive and send a signal, and the processor completes the method according to any one of the possible designs or implementations of the first aspect by using the transceiver. The communication apparatus may further include one or more memories. The memory may be coupled to the processor, and the memory may store computer programs or instructions for implementing the function in the first aspect. The processor may execute the computer programs or the instructions stored in the memory. When the computer programs or the instructions are executed, the communication apparatus is enabled to implement the method according to any one of the possible designs or implementations of the first aspect.

In a possible design, the communication apparatus includes a processor, and the processor may be coupled to a memory. The memory may store computer programs or instructions for implementing the function in the first aspect. The processor may execute the computer programs or the instructions stored in the memory. When the computer programs or the instructions are executed, the communication apparatus is enabled to implement the method according to any one of the possible designs or implementations of the first aspect.

In a possible design, the communication apparatus includes a processor and an interface circuit, and the processor is configured to: communicate with another apparatus through the interface circuit, and perform the method according to any one of the possible designs or implementations of the first aspect.

According to a fourth aspect, an embodiment of this application provides a communication apparatus. The communication apparatus may be an access network device or a chip that can be disposed in the access network device. The communication apparatus has a function for implementing the second aspect. For example, the communication apparatus includes a corresponding module, unit, or means for performing the operations in the second aspect. The module, unit, or means may be implemented by software or hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive uplink information from a terminal device. The processing unit may be configured to perform some internal operations of the communication apparatus. Functions performed by the processing unit and the communication unit may correspond to the operations in the second aspect.

In a possible design, the communication apparatus includes a processor, and may further include a transceiver. The transceiver is configured to receive and send a signal, and the processor completes the method according to any one of the possible designs or implementations of the second aspect by using the transceiver. The communication apparatus may further include one or more memories. The memory may be coupled to the processor, and the memory may store computer programs or instructions for implementing the function in the second aspect. The processor may execute the computer programs or the instructions stored in the memory. When the computer programs or the instructions are executed, the communication apparatus is enabled to implement the method in any one of the possible designs or implementations of the second aspect.

In a possible design, the communication apparatus includes a processor, and the processor may be coupled to a memory. The memory may store computer programs or instructions for implementing the function in the second aspect. The processor may execute the computer programs or the instructions stored in the memory. When the computer programs or the instructions are executed, the communication apparatus is enabled to implement the method in any one of the possible designs or implementations of the second aspect.

In a possible design, the communication apparatus includes a processor and an interface circuit, and the processor is configured to: communicate with another apparatus through the interface circuit, and perform the method according to any one of the possible designs or implementations of the second aspect.

It may be understood that in the third aspect or the fourth aspect, the processor may be implemented by hardware or software. When the processor is implemented by hardware, the processor may be a logic circuit, an integrated circuit, or the like. When the processor is implemented by the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a fifth aspect, an embodiment of this application provides a communication system. The communication system includes the communication apparatus according to the third aspect and the communication apparatus according to the fourth aspect.

According to a sixth aspect, an embodiment of this application provides a computer-readable storage medium. The computer storage medium stores computer-readable instructions, and when the computer-readable instructions are read and executed by a computer, the computer is enabled to perform the method in any one of the possible designs of the first aspect or the second aspect.

According to a seventh aspect, an embodiment of this application provides a computer program product. When a computer reads and executes the computer program product, the computer is enabled to perform the method in any one of the possible designs of the first aspect or the second aspect.

According to an eighth aspect, an embodiment of this application provides a chip. The chip includes a processor, and the processor is coupled to a memory and is configured to read and execute a software program stored in the memory, to implement the method according to any one of the possible designs of the first aspect or the second aspect.

These aspects or other aspects of this application are more concise and understandable in descriptions of the following embodiments.

DESCRIPTION OF EMBODIMENTS

Figure 1:
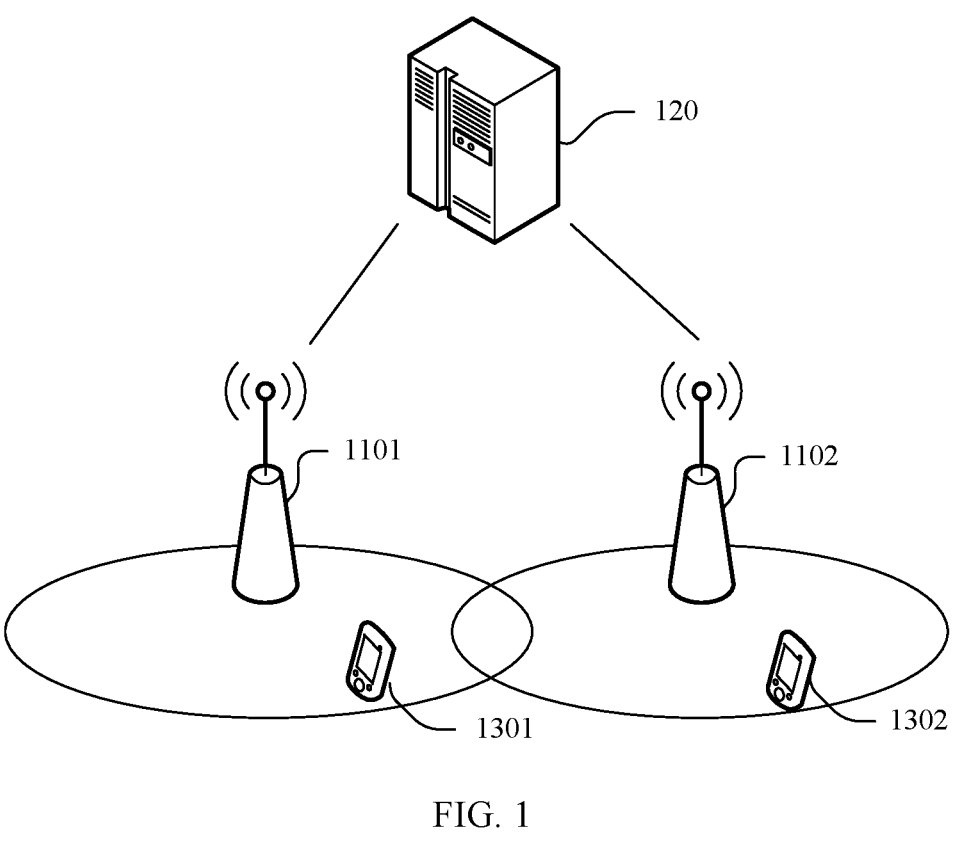
FIG. 1 to FIG. 3 are schematic diagrams of network architectures to which an embodiment of this application is applicable.

Technical solutions in embodiments of this application are described below with reference to accompanying drawings in embodiments of this application.

The technical solutions provided in embodiments of this application may be applied to various communication systems, for example, a long term evolution (LTE) system, a fifth generation (5G) mobile communication system, a wireless fidelity (Wi-Fi) system, a future communication system, a system in which a plurality of communication systems are converged, or the like. This is not limited in embodiments of this application. 5G may also be referred to as new radio (NR).

The technical solutions provided in embodiments of this application may be applied to communication between communication devices. Communication between the communication devices may include but is not limited to: communication between an access network device and a terminal device, communication between an access network device and an access network device, and/or communication between a terminal device and a terminal device. In embodiments of this application, a term "communication" may also be described as "transmission", "information transmission", "data transmission", "signal transmission", or the like. Transmission may include sending and/or receiving. Communication between an access network device and a terminal device is used as an example to describe the technical solutions in embodiments of this application. A person skilled in the art may also use the technical solutions in communication between another scheduling entity and a subordinate entity, for example, communication between a macro base station and a micro base station, for example, communication between a first terminal device and a second terminal device. The scheduling entity may allocate a radio resource such as an air interface resource to the subordinate entity.

First, some terms in embodiments of this application are described, to facilitate understanding of a person skilled in the art.

(1) Terminal device: The terminal device may be referred to as a terminal for short, and is a wireless terminal device that can perform wireless communication with an access network device. For example, the terminal device may receive scheduling information and indication information of the access network device. The wireless terminal device may be a device that provides voice and/or data connectivity for a user, a handheld device with a wireless connection function, or another processing device. The terminal device may communicate with one or more core networks or the Internet by using a radio access network (RAN).

The terminal device may be deployed on land, including indoor or outdoor, handheld or vehicle-mounted; or may be deployed on a water surface (such as a ship); or may be deployed in air (for example, on aircraft, a balloon, or a satellite). The terminal device may be user equipment (UE). The UE includes a handheld device, a vehicle-mounted device, a wearable device, or a computing device that has a wireless communication function. For example, the UE may be a mobile phone (mobile phone), a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus configured to implement a function of the terminal device may be a terminal device; or may be an apparatus that can support the terminal device in implementing the function, for example, a chip system. The apparatus may be installed in the terminal device or used in matching with the terminal device. In embodiments of this application, the chip system may include a chip, or may include a chip and another discrete component. The technical solutions provided in embodiments of this application are described by using an example in which the apparatus configured to implement the function of the terminal device is the terminal device.

(2) Access network device: The access network device may be a device in a wireless network. For example, the access network device may be a RAN node that connects a terminal device to the wireless network, and may also be referred to as a RAN device or a base station. Examples of some access network devices are a next generation NodeB (gNodeB), a transmission reception point (TRP), an evolved NodeB (evolved NodeB, eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), and the like. In a network structure, the access network device may be a central unit (CU) node, a distributed unit (DU) node, or an access network device that includes a CU node and a DU node. In another possible case, the access network device may be another apparatus that provides a wireless communication function for the terminal device. A specific technology and a specific device form that are used by the access network device are not limited in embodiments of this application. For convenience of description, in embodiments of this application, the apparatus that provides the wireless communication function for the terminal device is referred to as the access network device. In embodiments of this application, an apparatus configured to implement a function of the access network device may be an access network device; or may be an apparatus that can support the access network device in implementing the function, for example, a chip system. The apparatus may be installed in the access network device or used in matching with the access network device. The technical solutions provided in embodiments of this application are described by using an example in which the apparatus configured to implement the function of the access network device is the access network device.

(3) Terms "system" and "network" may be used interchangeably in embodiments of this application. "At least one" means one or more, and "a plurality of" means two or more. The term "and/or" is an association relationship for describing associated objects and represents that three relationships may exist. For example, A and/or B may represent the following three cases: Only A exists, both A and B exist, and only B exists, where A and B may be singular or plural. A character "/" generally indicates an "or" relationship between associated objects. "At least one of the following items (pieces)" or a similar expression thereof indicates any combination of these items, including a single item (piece) or any combination of a plurality of items (pieces). For example, "at least one of A, B, and C" includes A, B, C, A and B, A and C, B and C, or A, B, and C. Unless specifically stated, ordinal terms such as "first" and "second" mentioned in embodiments of this application are intended to distinguish a plurality of objects, and are not intended to limit a quantity, an order, a time sequence, priorities, or importance degrees of the plurality of objects.

FIG. 1 is a schematic diagram of a network architecture to which an embodiment of this application is applicable. As shown in FIG. 1, a terminal device may access a wireless network, to obtain a service of an external network (for example, the Internet) by using the wireless network, or to communicate with another device by using the wireless network, for example, communicate with another terminal device. The wireless network includes a RAN and a core network (CN). The RAN is configured to connect the terminal device (for example, a terminal device 1301 or a terminal device 1302) to the wireless network. The CN is configured to manage the terminal device and provide a gateway for communicating with the external network.

The RAN may include one or more access network devices, for example, an access network device 1101 and an access network device 1102.

The CN may include one or more CN devices, for example, a CN device 120. When the network architecture shown in FIG. 1 is applicable to a 5G communication system, the CN may include an access and mobility management function (AMF) entity, a session management function (SMF) entity, and a user plane function (UPF) entity.

It should be understood that a quantity of devices in a communication system shown in FIG. 1 is merely used as an example. Embodiments of this application are not limited thereto. In actual application, the communication system may further include more terminal devices and more access network devices, and may further include another device.

Figure 2:
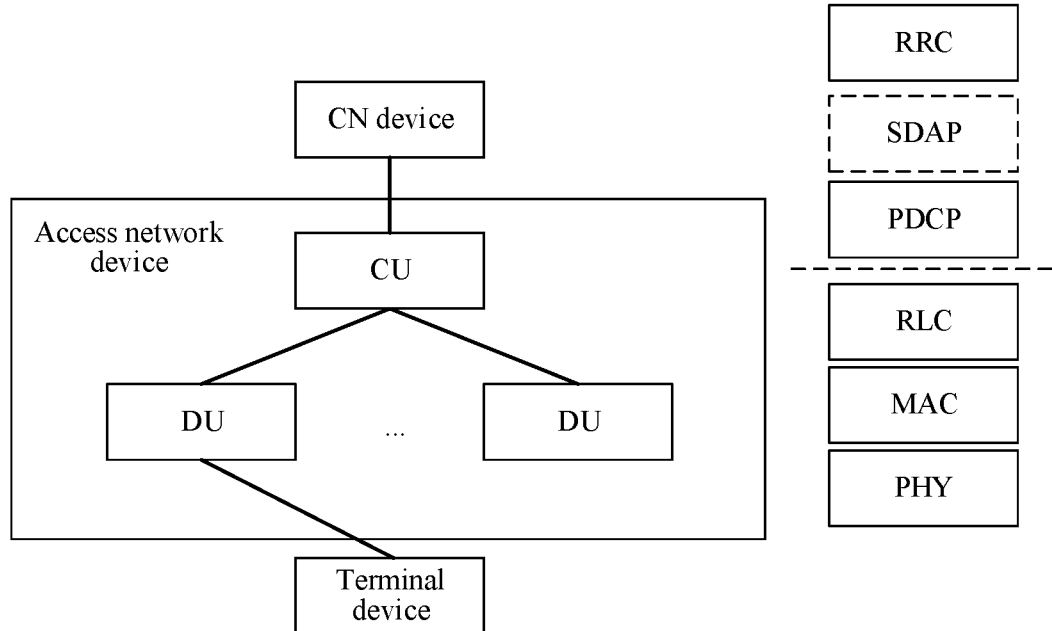

FIG. 2 is a schematic diagram of another network architecture to which an embodiment of this application is applicable. As shown in FIG. 2, the network architecture includes a CN device, an access network device, and a terminal device. The access network device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus. Alternatively, some functions of the radio frequency apparatus are independently integrated, and some functions are integrated into the baseband apparatus. For example, in an LTE communication system, the access network device includes a baseband apparatus and a radio frequency apparatus. The radio frequency apparatus may be remotely disposed relative to the baseband apparatus. For example, a remote radio unit (RRU) is a remote radio unit disposed relative to the BBU.

Communication between the access network device and the terminal device complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In a possible implementation, a service data adaptation protocol (SDAP) layer may be further included above the PDCP layer of the user plane protocol layer structure.

The access network device may use one node to implement the functions of the protocol layers such as the RRC layer, the PDCP layer, the RLC layer, the MAC layer, and the physical layer, or may use a plurality of nodes to implement the functions of the protocol layers. For example, in an evolved structure, the access network device may include a CU and a DU, and a plurality of DUs may be centrally controlled by one CU. As shown in FIG. 2, the CU and the DU may be allocated based on the protocol layers of a wireless network. For example, the functions of the PDCP layer and the protocol layers above the PDCP layer are allocated to the CU, and the functions of the protocol layers below the PDCP layer such as the RLC layer, the MAC layer, and the physical layer are allocated to the DU.

The allocation at such protocol layers is merely an example. The allocation may also be performed at other protocol layers such as the RLC layer, so that the functions of the RLC layer and the protocol layers above the RLC layer are allocated to the CU and the functions of the protocol layers below the RLC layer are allocated to the DU. Alternatively, the allocation is performed within a protocol layer. For example, some functions of the RLC layer and the functions of the protocol layers above the RLC layer are allocated to the CU, and remaining functions of the RLC layer and the functions of the protocol layers below the RLC layer are allocated to the DU. In addition, division may alternatively be performed in another manner, for example, the division is performed based on a delay. A function whose processing time needs to meet a delay requirement is set on the DU, and a function whose processing time does not need to meet the delay requirement is set on the CU.

In addition, the radio frequency apparatus may be independently integrated, not placed in the DU, or may be integrated in the DU. Alternatively, a part of the radio frequency apparatus may be remotely integrated in the DU. This is not limited herein.

Figure 3:
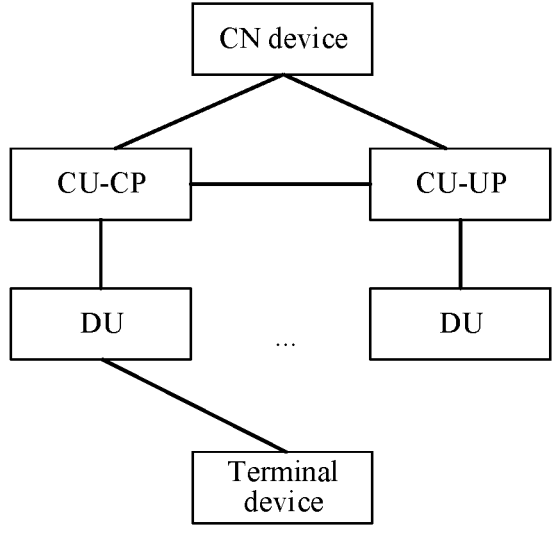

FIG. 3 is a schematic diagram of another network architecture to which an embodiment of this application is applicable. Compared with the network architecture shown in FIG. 2, in FIG. 3, a control plane (CP) and a user plane (UP) of a CU may be further separated and divided into different entities for implementation. The different entities are respectively a control plane (CP) CU entity (namely, a CU-CP entity) and a user plane (UP) CU entity (namely, a CU-UP entity).

In the foregoing network architecture, signaling generated by the CU may be sent to a terminal device by using a DU, or signaling generated by a terminal device may be sent to the CU by using a DU. For example, signaling at an RRC layer or a PDCP layer is finally processed as signaling at a PHY layer and sent to the terminal device, or is converted from received signaling at a PHY layer. In this architecture, it may also be considered that the signaling at the RRC layer or the PDCP layer is sent by the DU, or sent by the DU and a radio frequency apparatus.

The network architecture shown in FIG. 1, FIG. 2, or FIG. 3 may be applicable to communication systems of various radio access technologies (radio access technologies, RATs), for example, may be a 4G communication system, or may be a 5G communication system, or may be a transition system between a 4G communication system and a 5G communication system. The transition system may also be referred to as a 4.5G communication system, and certainly may also be a future communication system. The network architectures and service scenarios described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as a communication network architecture evolves and a new service scenario emerges.

An apparatus in the following embodiments of this application may be located in a terminal device or an access network device based on a function implemented by the apparatus. When the foregoing CU-DU structure is used, the access network device may be a CU, a DU, or an access network device including a CU and a DU.

The following first describes related technical features in embodiments of this application. It should be noted that, the explanations are intended to facilitate understanding of the embodiments of this application, but should not be construed as limiting the protection scope of this application.

1. RRC State of the Terminal Device

In the network architecture shown in FIG. 1, FIG. 2, or FIG. 3, the terminal device may perform an RRC connection setup process with the access network device. After an RRC connection with the access network device is set up, the RRC state of the terminal device is an RRC-connected state. Subsequently, the RRC state of the terminal device may be switched in the following states: an RRC-idle state, the RRC-connected state, and an RRC-inactive state.

First, the three RRC states of the terminal device are described.

(1) RRC-Connected State

For example, when the terminal device is in the RRC-connected state, there is the RRC connection between the terminal device and the access network device. In this case, the access network device knows that the terminal device is within coverage of the access network device or within a management range of the access network device. For example, the access network device knows that the terminal device is within coverage of a cell managed by the access network device. The core network knows coverage or a management range of an access network device within which the terminal device is located, and the core network knows an access network device through which the terminal device can be positioned or found.

Further, when the terminal device is in the RRC-connected state, the access network device and the terminal device may transmit a data channel and/or a control channel specific to the terminal device, to transmit specific information or unicast information of the terminal device. For example, the access network device may send a physical downlink control channel (PDCCH) and/or a physical downlink shared channel (PDSCH) that are specific to the terminal device to the terminal device, and/or the terminal device may send a physical uplink shared channel (PUSCH) and/or a physical uplink control channel (PUCCH) that are specific to the terminal device to the access network device. The terminal device may receive, through the PDCCH, an uplink scheduling indication or a downlink scheduling indication sent by the access network device. The terminal device may send, through the PUCCH, hybrid automatic repeat request (HARD) information to the access network device, to indicate a downlink data demodulation situation of the terminal device.

(2) RRC-Idle State

For example, when the terminal device is in the RRC-idle state, the RRC connection between the terminal device and the access network is released. In this case, the terminal device may receive a paging message, a broadcast channel, and/or system information from the access network device.

Further, when the terminal device is in the RRC-idle state, the access network device may not know whether the terminal device is within the coverage of the access network device or within the management range of the access network device. For example, the access network device may not know whether the terminal device is within the coverage of the cell managed by the access network device. The core network may not know coverage or a management range of an access network device within which the terminal device is, and the core network may not know an access network device through which the terminal device can be positioned or found.

(3) RRC-Inactive State

For example, when the terminal device is in the RRC-inactive state, there is no RRC connection between the terminal device and the access network device. In this case, the access network device may not know whether the terminal device is within the coverage of the access network device or within the management range of the access network device. For example, the access network device may not know whether the terminal device is within the coverage of the cell managed by the access network device. The core network may know a coverage or a management range of an access network device or coverages or management ranges of access network devices within which the terminal device is located, and the core network may not know an access network device or access network devices through which the terminal device can be positioned or found.

Further, when the terminal device is in the RRC-inactive state, the terminal device may receive a paging message, a synchronization signal, a broadcast message, and/or system information from the access network device.

In embodiments of this application, the RRC-inactive state and the RRC-idle state may be collectively referred to as RRC-non-connected states.

Figure 4:
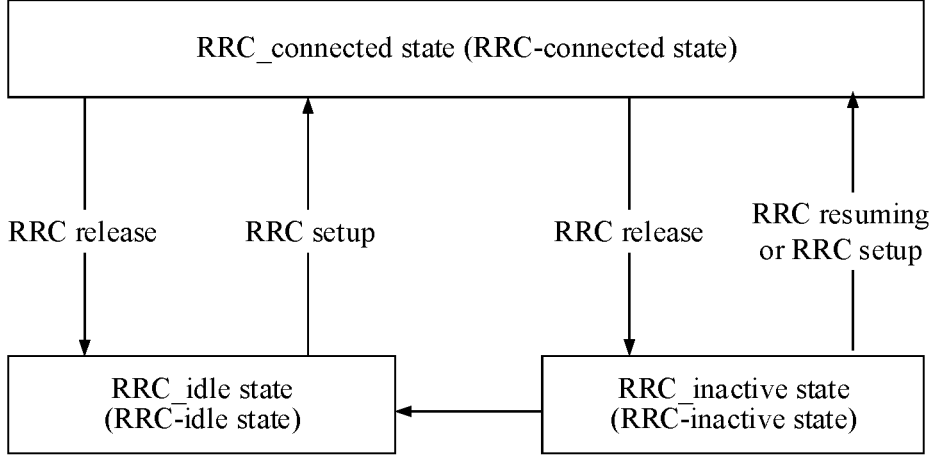
FIG. 4 is a schematic diagram of switching in three RRC states by a terminal device according to an embodiment of this application.

FIG. 4 is a schematic diagram of switching in the foregoing three RRC states by a terminal device according to an embodiment of this application. As shown in FIG. 4, the following possible switching cases may be included.

(1) RRC-Connected State→RRC-Idle State

For example, the access network device may send an RRC connection release (RRC connection release) message to the terminal device, so that the terminal device switches from the RRC-connected state to the RRC-idle state.

(2) RRC-Connected State→RRC-Inactive State

For example, the access network device may send an RRC connection suspend (RRC connection suspend) message or an RRC connection release message to the terminal device, so that the terminal device switches from the RRC-connected state to the RRC-inactive state.

(3) RRC-Idle State→RRC-Connected State

For example, the terminal device may enable the terminal device to switch from the RRC-idle state to the RRC-connected state through the RRC connection setup process with the access network device. The RRC connection setup process may be triggered by a higher layer of the terminal device. For example, when the terminal device needs to send uplink data, the higher layer of the terminal device triggers the RRC connection setup process. Alternatively, the RRC connection setup process may be triggered by the access network device. For example, when the terminal device is in the RRC-idle state, the access network device sends a paging message to the terminal device, where the paging message includes an identifier of the terminal device. Correspondingly, after receiving the paging message from the access network device, the terminal device triggers the RRC connection setup process.

Specifically, the RRC connection setup process may be that the terminal device sends an RRC connection request message to the access network device. After the access network device receives the request message, if the access network device sends an RRC connection setup message to the terminal device, it means that the access network device accepts access of the terminal device, and the RRC state of the terminal device may be switched to the RRC-connected state. If the access network device sends an RRC connection reject message to the terminal device, it means that the access network device rejects access of the terminal device, and the RRC state of the terminal device continues to be the RRC-idle state.

(4) RRC-Inactive State→RRC-Connected State

For example, when the terminal device is in the RRC-inactive state, the RRC state of the terminal device may be switched to the RRC-connected state through an RRC connection setup process or an RRC connection resume process.

In the RRC-inactive state, after the terminal device receives a paging message from the access network device or triggering by the higher layer of the terminal device is performed, the terminal device may initiate the RRC connection resume process to attempt to resume the RRC connection between the terminal device and the access network device, to enter the RRC-connected state. For example, the RRC connection resume process between the terminal device and the access network device includes: The terminal device sends an RRC connection resume request message to the access network device, and after receiving the request, the access network device sends an RRC connection setup message or an RRC connection resume message to the terminal device, so that the state of the terminal device can be switched to the RRC-connected state. Alternatively, the access network device sends an RRC release message to the terminal device, so that the state of the terminal device is switched from the RRC-inactive state to the RRC-idle state. Alternatively, the access network device sends an RRC connection reject message to the terminal device, so that the terminal device continues to stay in the RRC-inactive state.

(5) RRC-Inactive State→RRC-Idle State

For example, when the terminal device is in the RRC-inactive state, the access network device may enable the terminal device to switch from the RRC-inactive state to the RRC-idle state through a release process.

2. Beam

Higher carrier frequencies (for example, greater than or equal to 6 giga hertz (giga hertz, GHz)), for example, a band of 28 GHz, 38 GHz, or 72 GHz, will be used in a communication system (for example, a 5G communication system or a future communication system), to implement wireless communication with a larger bandwidth and a higher transmission rate. However, radio signals in such carrier frequencies may experience more severe fading during space propagation, and even the radio signals are difficult to detect at a receive end. Therefore, in the communication system, a beamforming (BF) technology is used to obtain a beam with good directivity, to increase an antenna gain and increase power in a transmit direction. Beamforming in the communication system is not limited to a high band, and may also be applied to a low band less than 6 GHz.

A beam may be understood as a communication resource, and the beam may be a wide beam, a narrow beam, or another type of beam. Different beams may be considered as different communication resources, and same information or different information may be sent by using different beams. A beam includes a transmit beam and a receive beam. The transmit beam may be signal strength distribution formed in different directions in space when a signal is transmitted by using an antenna. The receive beam may be distribution in which an antenna array enhances or weakens receiving of a radio signal in different directions in space. The transmit beam may be implemented by configuring a transmit filter, and the receive beam may be implemented by configuring a receive filter. The filter in embodiments of this application may include a digital filter, an analog filter, or a digital-analog hybrid filter. This is not specifically limited.

For example, the access network device sends a downlink reference signal by using a transmit beam x. Correspondingly, the terminal device may receive the downlink reference signal by using a receive beam y. In this case, the transmit beam x and the receive beam y may be understood as a beam pair. Further, if a measurement value of the downlink reference signal received by the terminal device by using the receive beam y is large, based on spatial channel reciprocity, receiving performance of the access network device receiving the signal sent by the terminal device by using a receive beam x' is also good. The receive beam x' has a high correlation degree with the transmit beam x, to be specific, a parameter of a receive filter corresponding to the receive beam x' and a parameter of a transmit filter corresponding to the transmit beam x are the same or highly close to each other, which is reflected in a result. In other words, a forming effect of the receive beam x' and a forming effect of the transmit beam x are the same or similar.

3. SSB

In the network architecture shown in FIG. 1, FIG. 2, or FIG. 3, the terminal device may receive a synchronization signal/broadcast channel block (SS/PBCH block, may also be referred to as SSB for short) sent by the access network device, to implement synchronization with the access network device, obtain system information, and the like.

(1) Formation of an SSB

Figure 5:
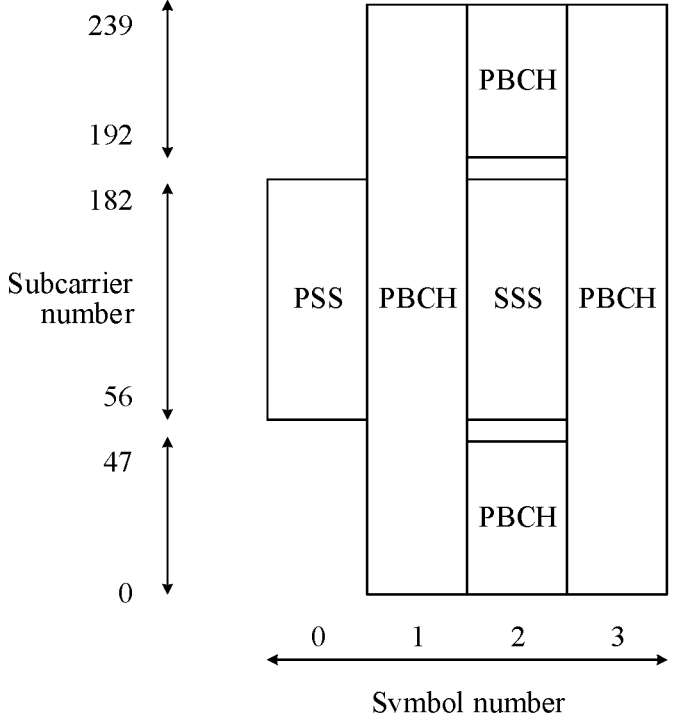
FIG. 5 is a schematic diagram of an synchronization signal block (SSB) according to an embodiment of this application.

In embodiments of this application, the SSB may include a primary synchronization signal (PSS), a secondary synchronization signal (SSS), and a physical broadcast channel (PBCH). As shown in FIG. 5, in time domain, one SSB occupies four orthogonal frequency division multiplexing (OFDM) symbols, which are denoted as a symbol 0 to a symbol 3. In frequency domain, one SSB occupies 20 resource blocks (RBs) (where one RB includes 12 subcarriers), namely, 240 subcarriers, and subcarrier numbers are 0 to 239. A PSS is located on 127 subcarriers in the middle of the symbol 0, and an SSS is located on 127 subcarriers in the middle of the symbol 2. To protect the PSS and the SSS, there are different guard subcarriers respectively. The guard subcarriers are not for carrying a signal. Subcarriers are separately reserved on two sides of the SSS as guard subcarriers. In FIG. 5, blank areas on the two sides of the SSS are guard subcarriers. A PBCH occupies all subcarriers of the symbol 1 and the symbol 3, and occupies some of remaining subcarriers other than the subcarriers occupied by the SSS in all subcarriers of the symbol 2 (namely, subcarriers other than the guard subcarriers in remaining subcarriers).

(2) Sending Mechanism of an SSB

Figure 6:
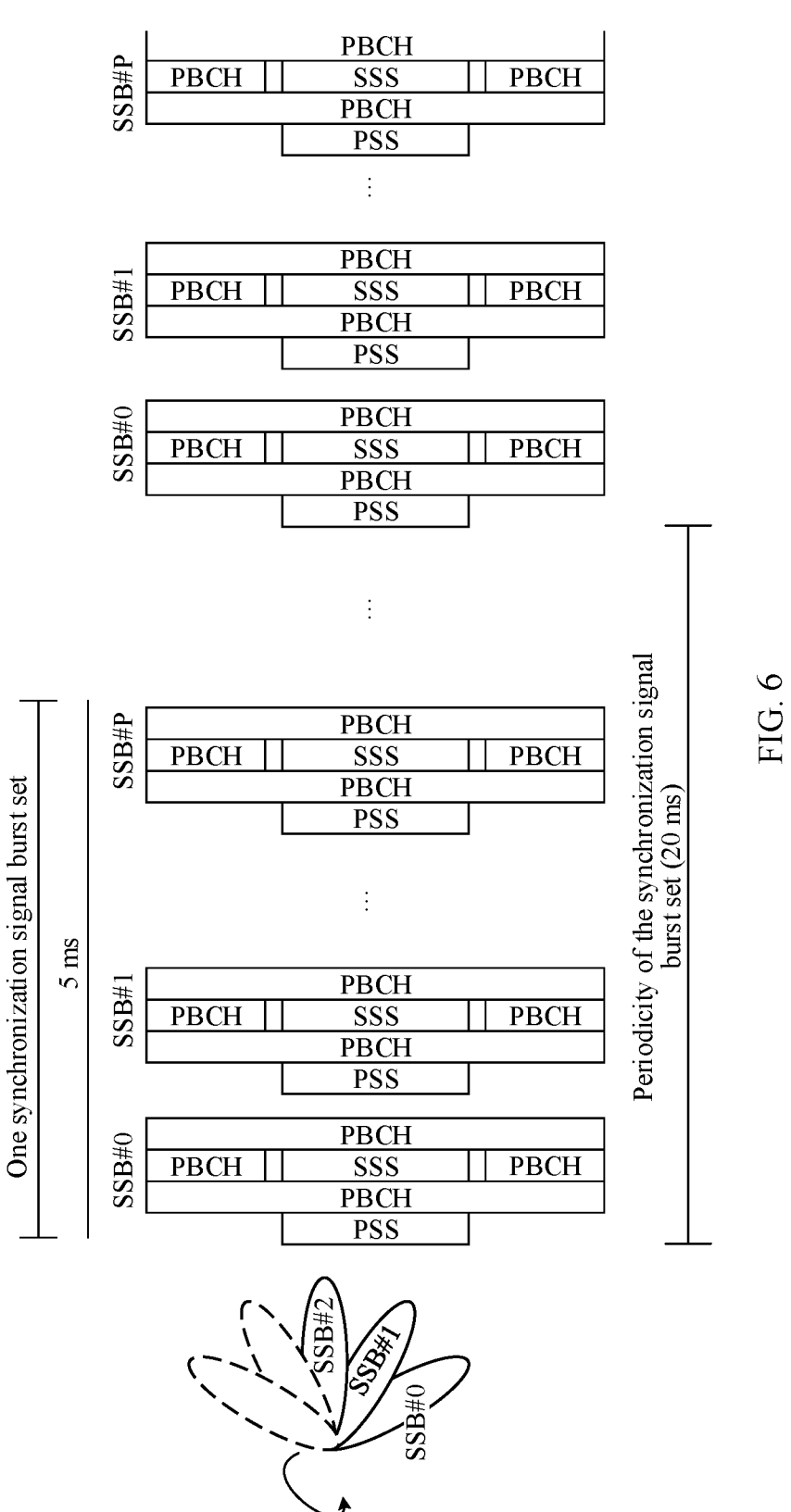
FIG. 6 is a schematic diagram of a synchronization signal burst set according to an embodiment of this application.

For a cell (or a carrier), the access network device may send an SSB at different moments by using different transmit beams, to complete broadcast beam coverage of the cell. As shown in FIG. 6, the access network device sends an SSB #0 by using a transmit beam 0, sends an SSB #1 by using a transmit beam 1, sends an SSB #2 by using a transmit beam 2, and the like. In this case, it may be understood that the transmit beam 0 corresponds to the SSB #0, the transmit beam 1 corresponds to the SSB #1, and the transmit beam 2 corresponds to the SSB #2.

A set of SSBs sent by the access network device in a beam scanning process may be referred to as a synchronization signal burst set (SS burst set) or an SSB burst set. A periodicity of the SS burst set is equivalent to a periodicity of an SSB corresponding to a specific beam, and may be configured as 5 ms (milliseconds), 10 ms, 20 ms, 40 ms, 80 ms, 160 ms, or the like.

For example, one SS burst set in a grant spectrum has at most 4, 8, or 64 SSBs. When a carrier band is less than or equal to 3 GHz, one SS burst set has at most 4 SSBs. Each SS burst set is within a time interval of 5 ms. For an example of the SS burst set, refer to FIG. 6. In FIG. 6, an example in which a periodicity of an SS burst set is 20 ms and one SS burst set includes P SSBs is used, where P is a positive integer. In FIG. 6, the P SSBs are within a time period of 5 ms in the 20 ms.

(3) Correspondence Between an SSB and a Random Access Channel (RACH) Occasion (RO for Short)

The access network device may indicate the correspondence between the SSB and the RO to the terminal device. For example, a network device may indicate the correspondence between the SSB and the RO to the terminal device by using system information. In another possible example, the correspondence between the SSB and the RO may also be predefined by using a protocol. The RO may be understood as a random access resource or a random access opportunity, namely, a time-frequency resource for carrying a random access preamble.

For example, when indicating the correspondence between the SSB and the RO to the terminal device, the access network device may indicate a quantity of SSBs corresponding to one RO and a quantity of candidate preambles corresponding to one SSB in one RO. By using an example in which an SSB burst set includes four SSBs (SSB1 to SSB4) and a frequency division multiplexing parameter of the RO is 4 (in other words, four ROs are for frequency division multiplexing in one time unit), the following describes the correspondence between the SSB and the RO with reference to two examples.

Figure 7:
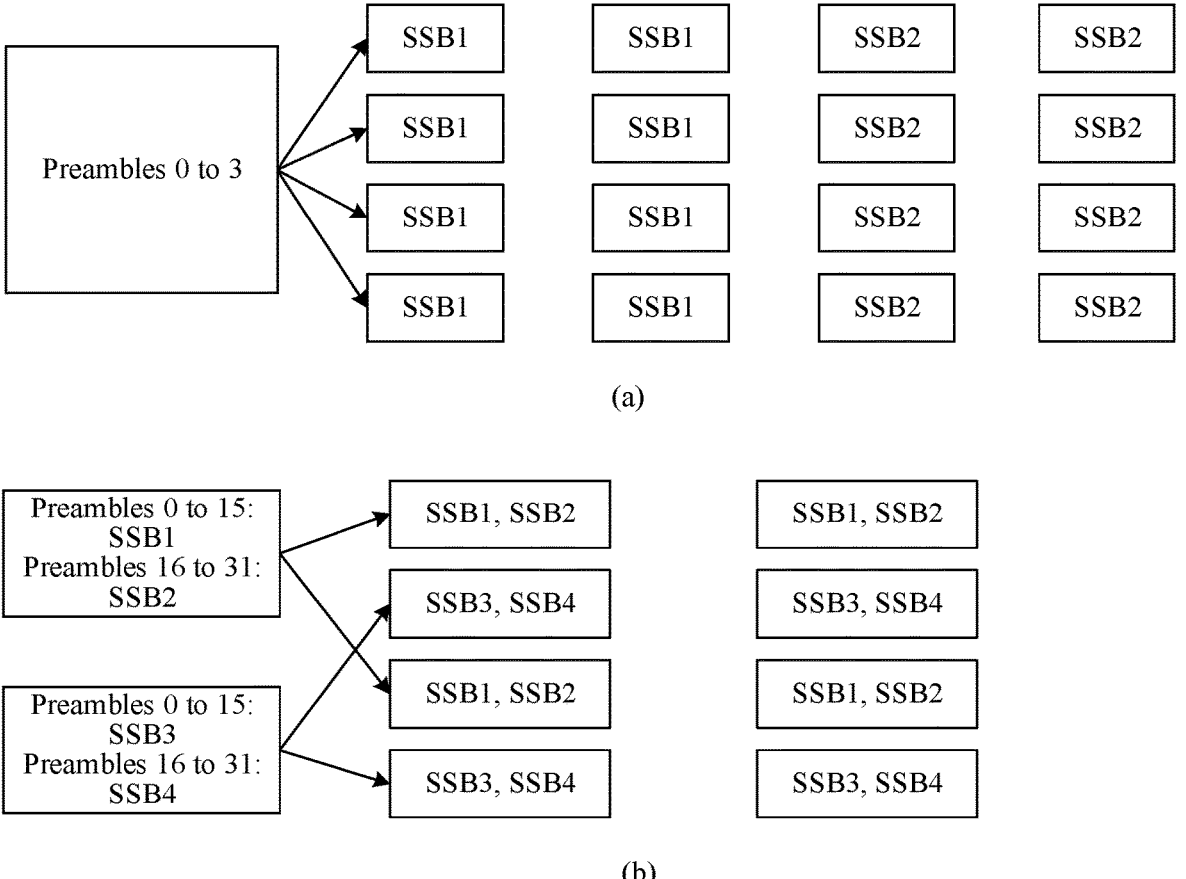
FIG. 7 is a schematic diagram of a correspondence between an SSB and a random access channel occasion (RO) according to an embodiment of this application.

In Example 1, refer to (a) in FIG. 7. The access network device indicates that a quantity of SSBs corresponding to one RO is ⅛ (one eighth), and indicates that a quantity of candidate preambles corresponding to one SSB in one RO is 4. In this case, a quantity of SSBs corresponding to one RO is ⅛, in other words, eight ROs correspond to one SSB. Therefore, eight ROs in first two time units correspond to SSB1, eight ROs in the following two time units correspond to SSB2, and so on. In addition, indexes of preambles corresponding to each RO are 0 to 3. When the terminal device learns, through measurement, that a measurement value of the SSB1 is high, the terminal device may select to send any one of the preambles whose indexes are 0 to 3 on any one of the eight ROs corresponding to the SSB1.

In Example 2, refer to (b) in FIG. 7. The access network device indicates that a quantity of SSBs corresponding to one RO is 2 (two), and indicates that a quantity of candidate preambles corresponding to one SSB in one RO is 16. In this case, a quantity of SSBs corresponding to one RO is 2. Therefore, an RO at a first frequency domain position in a first time unit corresponds to an SSB1 and an SSB2, an RO at a second frequency domain position in the first time unit corresponds to an SSB3 and an SSB4, an RO at a third frequency domain position in the first time unit corresponds to the SSB1 and the SSB2, an RO at a fourth frequency domain position in the first time unit corresponds to the SSB3 and the SSB4, and so on. In addition, indexes of preambles corresponding to the SSB1 are 0 to 15, indexes of preambles corresponding to the SSB2 are 16 to 31, indexes of preambles corresponding to the SSB3 are 0 to 15, and indexes of preambles corresponding to the SSB4 are 16 to 31. When the terminal device obtains, through measurement, that a measurement value of the SSB1 is high, the terminal device may select to send any one of the preambles whose indexes are 0 to 15 on any one RO corresponding to the SSB1.

It should be noted that, the time unit in the foregoing two examples may include one or more symbols, or include one or more slots. A specific length of the time unit is not be limited in embodiments of this application.

Based on the descriptions of the foregoing related technical features, for a terminal device in an RRC-non-connected state (using an RRC-inactive state as an example), before third generation partnership project (3GPP) release 16, the terminal device in the RRC-inactive state is not supported in performing unicast data transmission. To be specific, the terminal device can perform unicast data transmission only after an RRC connection is resumed and the terminal device enters an RRC-connected state. However, in some scenarios, a data packet that needs to be transmitted by the terminal device in the RRC-inactive state is usually small (namely, small data). If an RRC connection setup process occurs each time the terminal device performs data transmission, to enter the RRC-connected state from the RRC-inactive state, unnecessary power consumption and signaling overheads are caused.

There may be a plurality of small data transmission scenarios, which may specifically cover a smartphone-related service such as an instant message of WeChat™ or QQ™ a heartbeat packet of an application (APP), or a push message; and a non-smartphone-related service such as periodic data (for example, a heartbeat packet) of a wearable device, or periodic data sent by an industrial wireless sensor network. In addition, a specific size of the small data may not be limited in embodiments of this application. For example, a data packet of 100 to 300 bytes may be considered as small data. For another example, a data packet that can be sent in one slot may be considered as small data (for example, if quadrature phase shift keying (QPSK) is for modulation for one slot whose bandwidth resource is 5 M and whose subcarrier spacing is 30 kHz, about 500 bytes may be transmitted). For another example, a user plane data packet and/or a control plane data packet sent in the RRC-inactive state may be considered as small data.

In a small data transmission scenario, the terminal device may be supported in performing small data transmission when the terminal device is in the RRC-inactive state, without switching state, thereby significantly reducing signaling overheads and power consumption of the terminal device.

For example, that the terminal device performs small data transmission when the terminal device is in the RRC-inactive state may be specifically implemented by using the following two methods.

(1) Data Transmission Based on Random Access (RA)

Different from conventional random access, the data transmission based on random access means that the terminal device sends, in a random access process, uplink data (for simplicity, data described below in embodiments of this application represents user plane data unless otherwise specified) to an access network device, or receive downlink data.

For example, the random access process may include a four-step random access process and a two-step random access process. The terminal device may send the uplink data by using a message 3 (Msg3) in the four-step random access process, or receive the downlink data by using a message 4 (Msg4). Alternatively, the terminal device may send the uplink data by using a message A (MsgA) in the two-step random access process, or receive the downlink data by using a message B (MsgB).

Figure 8:
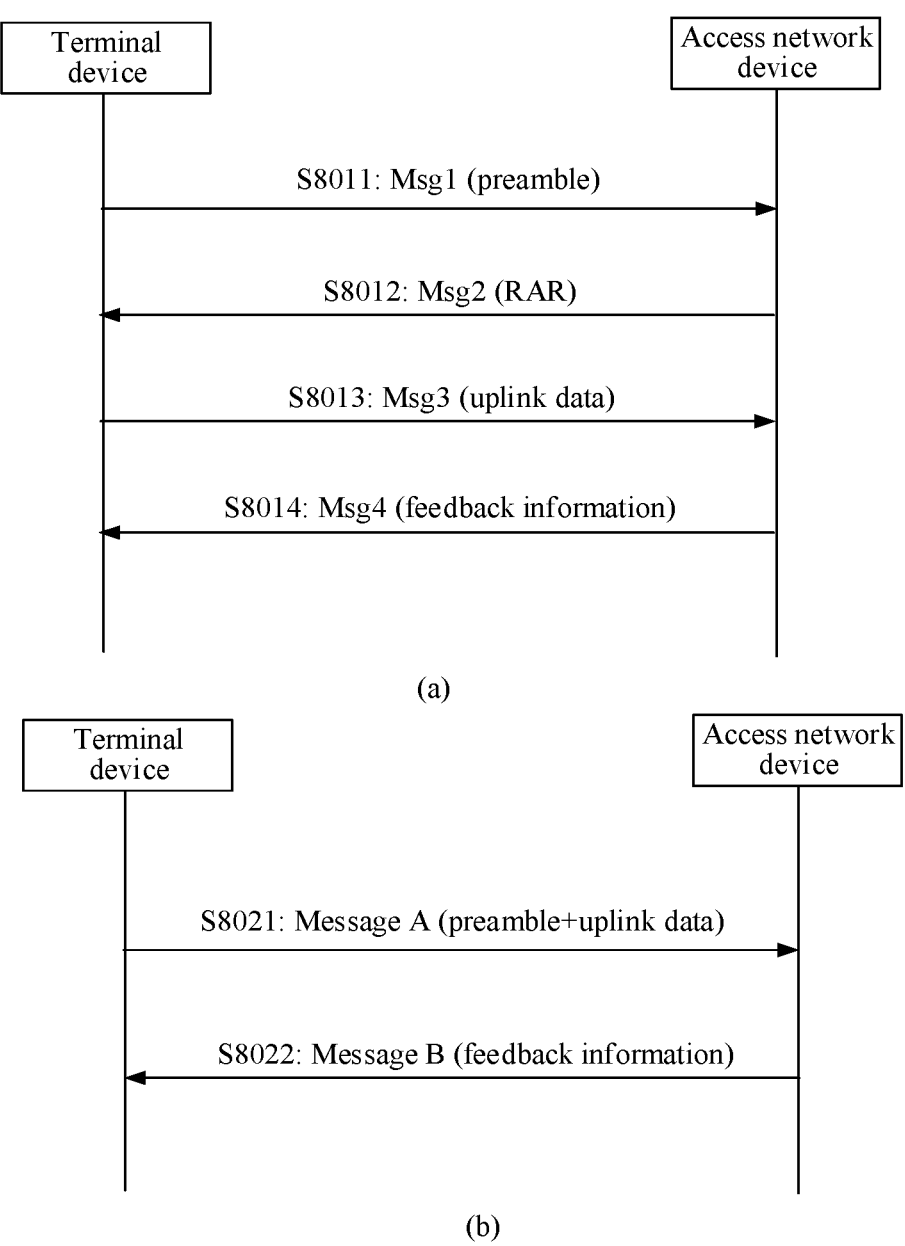
FIG. 8 is a schematic diagram of two random access processes according to an embodiment of this application.

(a) FIG. 8 is a schematic diagram of a four-step random access process according to an embodiment of this application. As shown in (a) in FIG. 8, the four-step random access process may include the following steps.

S8011: A terminal device sends a random access preamble to an access network device through a physical random access channel (PRACH), that is, sends a message 1 (Msg1) to the access network device.

For example, the preamble may be a sequence, and is used by the access network device to determine a timing advance (TA) of the terminal device.

S8012: The access network device sends, after detecting the random access preamble sent by the terminal device, a random access response (RAR) to the terminal device, that is, sends a message 2 (Msg2) to the terminal device. The message 2 may indicate a resource position of a PUSCH.

S8013: The terminal device sends, based on the resource position of the PUSCH indicated by the message 2, a message 3 to the access network device through the PUSCH. The message 3 may include uplink data, for example, uplink small data. Optionally, the message 3 may further include an identifier of the terminal device.

S8014: The access network device receives the message 3, and sends a message 4 to the terminal device, where the message 4 may include feedback information, to notify the terminal device whether the uplink data is successfully received.

It should be noted that, a PRACH resource, a preamble, and a resource for receiving the RAR that are in the foregoing four-step random access process may all be configured by the access network device for the terminal device. For example, the access network device may configure a dedicated resource for the terminal device when the terminal device is in a connected state, or may broadcast a resource for contention in a system message.

(b) FIG. 8 is a schematic diagram of a two-step random access process according to an embodiment of this application. As shown in (b) in FIG. 8, the two-step random access process may include the following steps.

S8021: A terminal device sends a message A to an access network device. Specifically, the terminal device sends a random access preamble to the access network device through a PRACH, and sends uplink data (for example, uplink small data) to the access network device through a corresponding PUSCH. Optionally, the terminal device may also send an identifier of the terminal device.

S8022: The access network device sends, after receiving the message A, a message B to the terminal device. The message B may include an RAR, and the RAR may include feedback information of the message A, to notify the terminal device whether the uplink data is successfully received.

It should be noted that, a PRACH resource, a preamble, a PUSCH resource (including a resource of a demodulation reference signal (DMRS) in the PUSCH)), and a resource for receiving the RAR that are in the foregoing two-step random access process may be configured by the access network device for the terminal device. For example, the access network device may configure a dedicated resource for the terminal device when the terminal device is in a connected state, or may broadcast a resource for contention in a system message.

(2) Data Transmission Based on Configured Grant (CG) Resources

The data transmission based on CG resources means that the access network device may configure, for the terminal device, a resource for uplink data (for example, PUSCH) transmission. When the terminal device needs to send uplink data, the terminal device directly sends the data to the access network device by using CG resources, without needing to receive dynamic grant (dynamic grant) from the access network device and without needing to send a preamble. The data transmission based on CG resources may also be referred to as grant free (GF) data transmission. Because the terminal device does not need to send the preamble, compared with a data transmission solution based on random access, signaling overheads and power consumption of the terminal device can be further reduced.

However, in the data transmission based on CG resources, the terminal device in the RRC-inactive state does not have a beam management process similar to that in the RRC-connected state. Therefore, the access network device usually does not know the position information (or channel information) of the terminal device in the RRC-inactive state, and further, does not know which receive beam is for receiving the uplink data to be sent by the terminal device on the CG resources. When the access network device does not know the channel information of the terminal device, if the access network device receives the uplink data by using an omnidirectional antenna, receiving performance is deteriorated. A performance improvement solution is to rely on digital filtering processing. However, when there is no channel information of the terminal device, the receiving complexity of the access network device is significantly increased.

Based on this, related implementation of the data transmission based on CG resources is studied in embodiments of this application.

The following describes in detail embodiments of this application with reference to Embodiment 1 to Embodiment 3.

Embodiment 1

To resolve a problem that the receiving performance loss is caused because the access network device does not know the channel information of the terminal device, a possible idea is to set up a correspondence between a CG resource and channel information. In this way, the access network device can receive, based on the channel information corresponding to the CG resource, uplink data on the CG resource by using a corresponding receive beam, thereby improving receiving performance for the uplink data.

Specifically, the access network device may periodically broadcast downlink reference signals. It is common for the terminal device to measure the downlink reference signals when the terminal device is in an RRC-non-connected state. In addition, based on a spatial channel reciprocity relationship, when the terminal device determines, through the measurement of the downlink reference signals, that a measurement value of a downlink reference signal is large (for example, a measurement value of a downlink reference signal 1 is large, and a beam used by the access network device to send the downlink reference signal 1 is a transmit beam x), receiving performance of the access network device receiving the signal sent by the terminal device by using a corresponding receive beam x' is also good. Therefore, a communication method provided in Embodiment 1 of this application may include the following steps. An access network device may send first configuration information to a terminal device, where the first configuration information is for configuring M CG resources to correspond N downlink reference signals, and the N downlink reference signals include a downlink reference signal 1. Further, after entering an RRC-non-connected state, the terminal device may send uplink data on a CG resource corresponding to the downlink reference signal 1. Correspondingly, the access network device may receive, by using a corresponding receive beam, the uplink data sent by the terminal device on the CG resource. M and N are positive integers. Compared with the approach in which the access network device does not know the channel information of the terminal device and attempts to receive the uplink data by using the omnidirectional antenna, this approach can effectively improve the receiving performance of the access network device.

Figure 9:
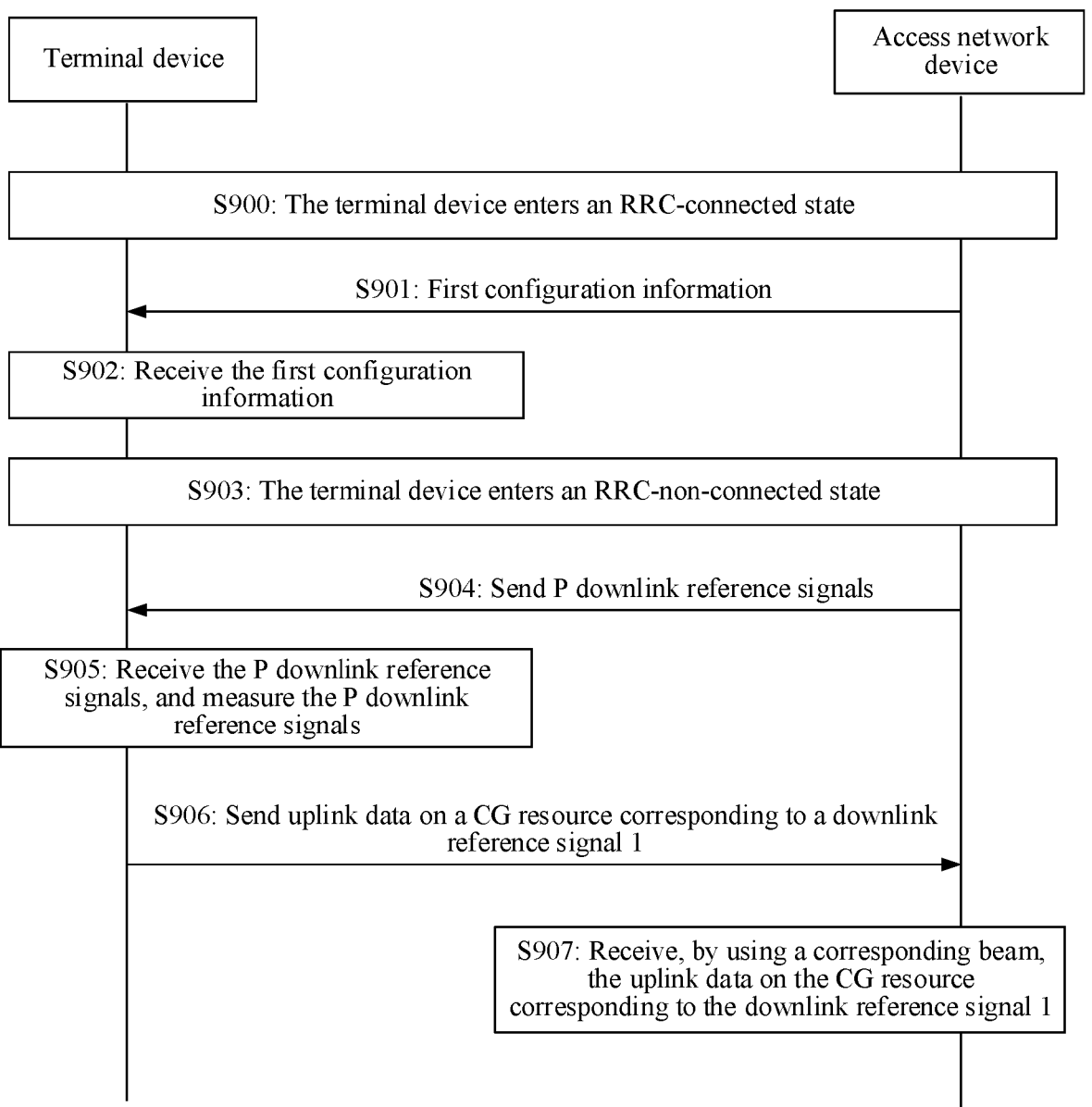
FIG. 9 is a schematic flowchart corresponding to a communication method according to Embodiment 1 of this application.

The following describes in detail the communication method provided in Embodiment 1 of this application with reference to FIG. 9.

FIG. 9 is a schematic flowchart corresponding to a communication method according to Embodiment 1 of this application. As shown in FIG. 9, the method includes the following steps.

Optionally, in S900: A terminal device enters an RRC-connected state.

Herein, the terminal device may switch an RRC state to the RRC-connected state through an RRC connection setup process or an RRC connection resume process.

Optionally, in S901: An access network device sends first configuration information to the terminal device, where the first configuration information is for configuring M CG resources to correspond N downlink reference signals.

Correspondingly, in S902: The terminal device may receive the first configuration information from the access network device.

Herein, the access network device may further configure the M CG resources for the terminal device. In an example, the access network device may configure the M CG resources for the terminal device by using the first configuration information. In other words, the first configuration information may be for configuring the M CG resources and configuring the M CG resources to correspond the N downlink reference signals. There be a plurality of manners in which the access network device sends the first configuration information to the terminal device. For example, the access network device may send an RRC message to the terminal device, where the RRC message includes the first configuration information. For example, the RRC message may be an RRC connection release message or another possible message. This is not specifically limited.

In still another example, the access network device may configure the M CG resources for the terminal device by using third configuration information. For example, the access network device may send the first configuration information and the third configuration information to the terminal device by using a same message. Alternatively, the access network device may send the first configuration information and the third configuration information to the terminal device by using different messages. For example, the access network device may first send an RRC message 1 to the terminal device, where the RRC message 1 includes the third configuration information; and then send an RRC message 2 to the terminal device, where the RRC message 2 includes the first configuration information.

1. The M CG Resources are Described.

The M CG resources may be used by the terminal device to send uplink information to the access network device when the terminal device is in an RRC-non-connected state. For example, the M CG resources may be dedicated to sending the uplink information by the terminal device when the terminal device is in the RRC-non-connected state. For another example, the M CG resources may be used by the terminal device to send the uplink information when the terminal device is in an RRC-connected state, or may be used by the terminal device to send the uplink information when the terminal device is in the RRC-non-connected state. The uplink information may include uplink data and/or uplink signaling, and the uplink signaling may include at least one of the following: signaling at a physical layer, signaling at a MAC layer, and signaling at an RRC layer. The uplink data and/or the uplink signaling may be carried on a PUSCH and/or a PUCCH specific to the terminal device.

In some embodiments of this application, the CG resource may support a plurality of possible granularities such as a granularity of "set", a granularity of "periodicity", and a granularity of "quantity". For example, one set of CG resources may correspond to one periodicity (length), and one periodicity may include one or more CG resources. One CG resource may be for one time of data transmission. A plurality of CG resources included in one periodicity may be for repeatedly transmitting same data, and redundancy versions of the data transmitted through the plurality of CG resources may be the same or different. In other words, a plurality of CG resources included in one periodicity may be understood as a plurality of repetition opportunities. Any two different CG resources in the plurality of CG resources in the one periodicity may be divided by time and/or frequency. This is not limited.

The access network device sends configuration information of W sets of CG resources to the terminal device (for example, by using the first configuration information), where W is a positive integer. For example, W=3, and the W sets of CG resources may include a first set of CG resources, a second set of CG resources, and a third set of CG resources. By using the first set of CG resources as an example, configuration information of the first set of CG resources may include at least one of the following: (1) a duration of a periodicity corresponding to the first set of CG resources; (2) a quantity of repetitions in a periodicity, or a quantity of repetition opportunities included in a periodicity, or a quantity of CG resources included in a periodicity; and (3) time-frequency position information of each CG resource in a periodicity. Optionally, one set of CG resources may also be referred to as a group of CG resources or another name, which is not limited.

Optionally, the configuration information of the first set of CG resources may further include other possible information, for example, one or more of the following: frequency hopping indication information (indicating intra-slot or inter-slot frequency hopping), DMRS configuration information (indicating a type, a position, a length of a DMRS, and/or whether the DMRS is pre-coded), a modulation and coding scheme (MCS) table, a resource allocation manner (indicating Type 0, Type 1, or dynamic switching), power control indication information, a quantity of HARQ processes (for example, may be one of 1 to 16), and a redundancy version used during repetition. This is not specifically limited.

2. The N Downlink Reference Signals are Described.

For example, the downlink reference signal may be an SSB, a channel state information reference signal (CSI-RS), a positioning reference signal (PRS), a downlink DMRS, or another possible downlink reference signal. This is not specifically limited. In some embodiments of this application, an example in which the downlink reference signal is the SSB is used for description.

As described above, one SS burst set may include a plurality of SSBs. For example, if one SS burst set includes four SSBs: an SSB1, an SSB2, an SSB3, and an SSB4, N may be a positive integer less than or equal to 4. In other words, the N downlink reference signals may include at least one of the SSB 1, the SSB2, the SSB3, or the SSB4. For another example, if one SS burst set includes eight SSBs: an SSB1, an SSB2, . . . , and an SSB8, N may be a positive integer less than or equal to 8. In other words, the N downlink reference signals may include at least one of the SSB 1, the SSB2, . . . , and the SSB8.

3. That the M CG Resources Correspond to the N Downlink Reference Signals is Described.

For example, there may be a plurality of specific corresponding manners in which the M CG resources correspond to the N downlink reference signals. The following describes three possible corresponding manners.

(1) Corresponding manner 1: The M CG resources correspond to N downlink reference signals at the granularity of "set". For example, the M CG resources belong to one or more sets of CG resources, where each CG resource may belong to only one of the sets of CG resources. Each set of CG resources may correspond to one or more downlink reference signal in the N downlink reference signals. In addition, one downlink reference signal may also correspond to one or more sets of CG resources.

Figure 10:
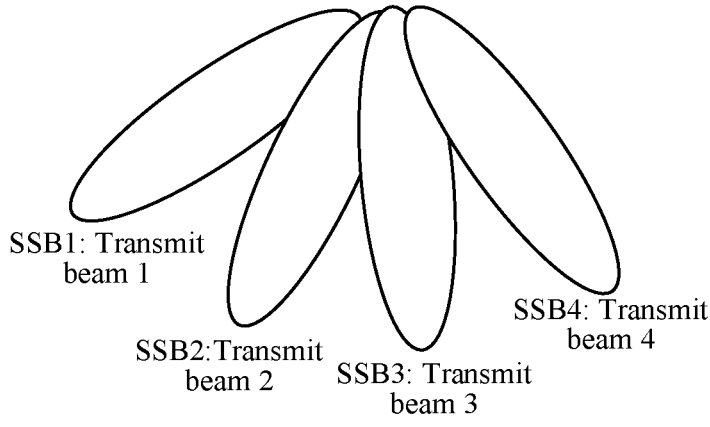
FIG. 10 is a schematic diagram of a beam corresponding to an SSB according to an embodiment of this application.
Figure 11:
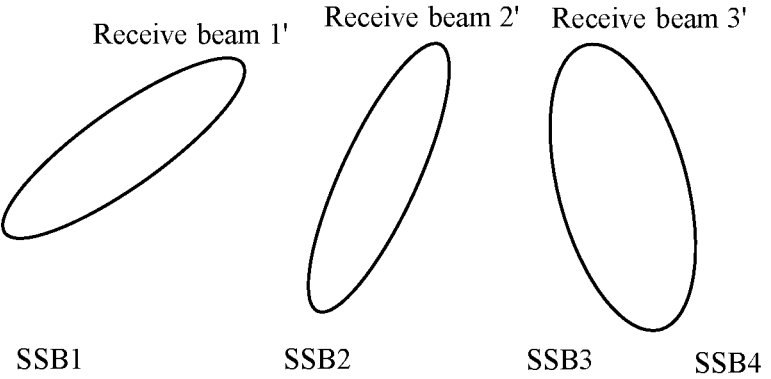
FIG. 11 to FIG. 13 are schematic diagrams of a corresponding situation between a CG resource and a downlink reference signal according to an embodiment of this application.

For example, the M CG resources belong to W sets of CG resources. In an example in which W=3, the W sets of CG resources may include a first set of CG resources, a second set of CG resources, and a third set of CG resources. For example, the M CG resources may include all CG resources included in the first set of CG resources, all CG resources included in the second set of CG resources, and all CG resources included in the third set of CG resources. The N downlink reference signals include an SSB1, an SSB2, an SSB3, and an SSB4. As shown in FIG. 10, the SSB1 corresponds to a transmit beam 1, the SSB2 corresponds to a transmit beam 2, the SSB3 corresponds to a transmit beam 3, and the SSB4 corresponds to a transmit beam 4. In this case, a possible corresponding case is as follows. As shown in FIG. 11, the first set of CG resources may correspond to the SSB1, the second set of CG resources may correspond to the SSB2, and the third set of CG resources may correspond to the SSB3 and the SSB4. In this case, it may be understood that all the CG resources included in the first set of CG resources correspond to the SSB1, and all the CG resources included in the second set of CG resources correspond to the SSB2, and all the CG resources included in the third set of CG resources correspond to the SSB3 and the SSB4.

For another example, the M CG resources belong to W sets of CG resources. By using an example in which W=3, the W sets of CG resources may include a first set of CG resources, a second set of CG resources, and a third set of CG resources. For example, the first set of CG resources include 2 CG resources in one periodicity, the second set of CG resources include 3 CG resources in one periodicity, and the third set of CG resources include 3 CG resources in one periodicity. In this case, the M resources are 2+3+3=8 CG resources. In this case, a possible corresponding case is as follows. The first set of CG resources may correspond to an SSB1, the second set of CG resources may correspond to an SSB2, and the third set of CG resources may correspond to an SSB3 and an SSB4. In this case, it may be understood that 2 CG resources in each periodicity of the first set of CG resources correspond to the SSB1, 3 CG resources in each periodicity of the second set of CG resources correspond to the SSB2, and 3 CG resources in each periodicity of the third set of CG resources correspond to the SSB3 and the SSB4.

When the access network device configures, in the corresponding manner, that the M CG resources correspond to the N downlink reference signals, for any one of the sets of CG resources, a possible configuration example is as follows:

ConfiguredGrantConfig (configuration information of the set of CG resources) ::=

SEQUENCE {

...

CorrespondingRS      ENUMERATED {SSB, CSI-RS, PRS} OPTIONAL, (a type of a downlink reference signal corresponding to the set of CG resources is, for example, one of the SSB, the CSI-RS, or the PRS)

CorrespondingRSIndex-1      INTEGER (0..63)      OPTIONAL, (an index of a corresponding first downlink reference signal)

CorrespondingRSIndex-2      INTEGER (0..63)      OPTIONAL, (an index of a corresponding second downlink reference signal)

RSRPofRS      RSRP      OPTIONAL,

-continued

---

(for a threshold (for example, a first threshold described below) corresponding to
the RSRP, when RSRP obtained by measuring a downlink reference signal is greater than or
equal to the threshold, it means that uplink data may be sent by using a CG resource
corresponding to the downlink reference signal)

...
  }

---

(2) Corresponding manner 2: The M CG resources correspond to N downlink reference signals at the granularity of "periodicity". For example, the M CG resources are in one or more periodicities, and each CG resource may be in only one periodicity. Each periodicity may correspond to one or more downlink reference signals in the N downlink reference signals. In addition, one downlink reference signal may correspond to one or more periodicities.

For example, that the M CG resources are in a plurality of periodicities may mean that the M CG resources are in a plurality of periodicities of one set of CG resources, in other words, the M CG resources include CG resources in the plurality of periodicities of the set of CG resources. For example, the M CG resources are in a periodicity i, a periodicity i+1, and a periodicity i+2 of the set of CG resources, in other words, the M CG resources include CG resources in the periodicity i, the periodicity i+1, and the periodicity i+2, where i may be a positive integer. The N downlink reference signals include an SSB1, an SSB2, an SSB3, and an SSB4. As shown in FIG. 10, the SSB1 corresponds to a transmit beam 1, the SSB2 corresponds to a transmit beam 2, the SSB3 corresponds to a transmit beam 3, and the SSB4 corresponds to a transmit beam 4. In this case, a possible corresponding case is as follows. The periodicity i corresponds to the SSB1, the periodicity i+1 corresponds to the SSB2, and the periodicity i+2 corresponds to the SSB3 and the SSB4. To be specific, all CG resources in the periodicity i correspond to the SSB1, all CG resources in the periodicity i+1 correspond to the SSB2, and all CG resources in the periodicity i+2 correspond to the SSB3 and the SSB4.

Figure 12:
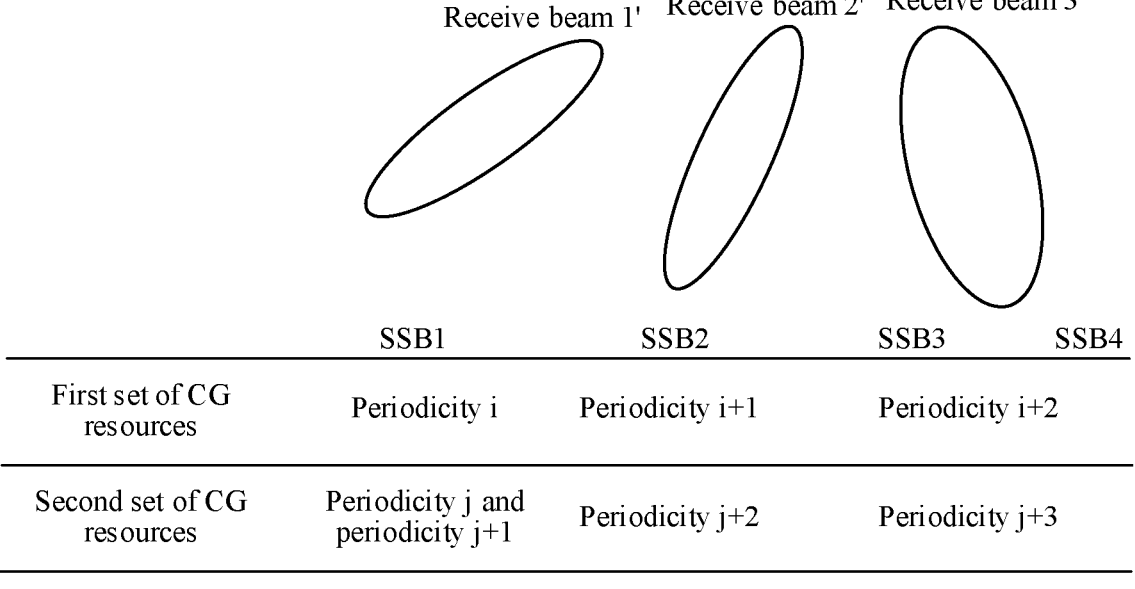

For another example, that the M CG resources are in a plurality of periodicities may also mean that the M CG resources are in a plurality of periodicities of a plurality of sets of CG resources. For example, the M CG resources are in one or more periodicities (for example, a periodicity i, a periodicity i+1, and a periodicity i+2) of a first set of CG resources and one or more periodicities (for example, a periodicity j, a periodicity j+1, and a periodicity j+2) of a second set of CG resources. To be specific, the M CG resources include CG resources in the one or more periodicities of the first set of CG resources and CG resources in the one or more periodicities of the second set of CG resources. The N downlink reference signals include an SSB1, an SSB2, an SSB3, and an SSB4. As shown in FIG. 10, the SSB1 corresponds to a transmit beam 1, the SSB2 corresponds to a transmit beam 2, the SSB3 corresponds to a transmit beam 3, and the SSB4 corresponds to a transmit beam 4. In this case, a possible corresponding case is as follows. As shown in FIG. 12, in the first set of CG resources, the periodicity i corresponds to the SSB1, the periodicity i+1 corresponds to the SSB2, and the periodicity i+2 corresponds to the SSB3 and the SSB4. In the second set of CG resources, the periodicity j and the periodicity j+1 correspond to the SSB1, the periodicity j+2 corresponds to the SSB2, a periodicity j+3 corresponds to the SSB3 and the SSB4, where j may be a positive integer. It should be noted that, the periodicities of the first set of CG resources and the periodicities of the second set of CG resources may separately and independently correspond to the downlink reference signals. For example, when CG resources in the periodicity i of the first set of CG resources and CG resources in the periodicity j of the second set of CG resources overlap in time domain, the periodicity i of the first set of CG resources and the periodicity j of the second set of CG resources may correspond to a same SSB, or may correspond to different SSBs. This is not specifically limited. In addition, it can be learned that, compared with a correspondence shown in FIG. 11, a correspondence shown in FIG. 12 enables the terminal device to have better flexibility in selecting a periodicity.

(3) Corresponding manner 3: The M CG resources correspond to N downlink reference signals at the granularity of "quantity". For example, one or more CG resources in the M CG resources correspond to one or more downlink reference signals in the N downlink reference signals. In other words, one CG resource may correspond to one or more downlink reference signals, and/or one downlink reference signal may correspond to one or more CG resources.

Figure 13:
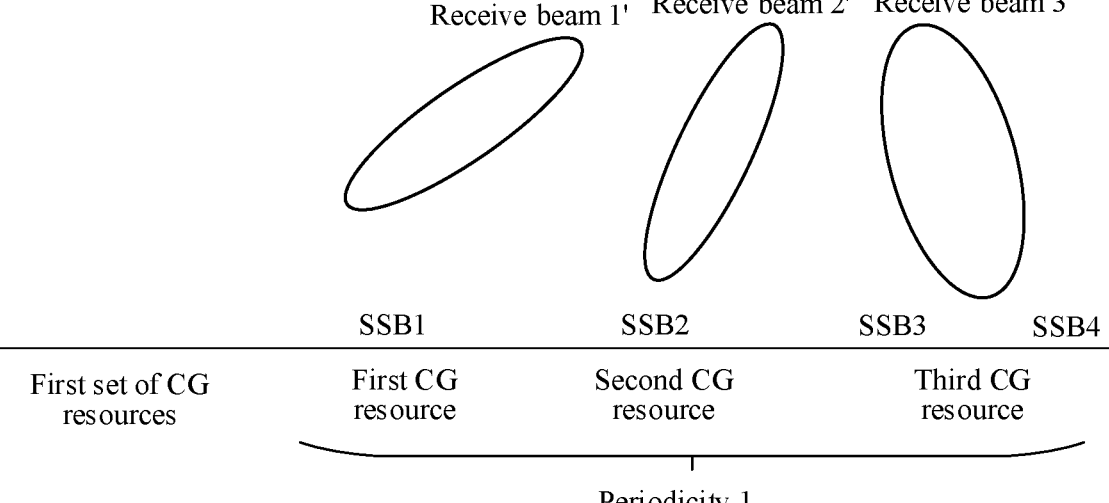

For example, the M CG resources may be M CG resources in one set of CG resources. Alternatively, the M CG resources may also be M CG resources in a plurality of sets of CG resources. For example, the M CG resources may include M1 CG resources in a first set of CG resources and M2 CG resources in a second set of CG resources. M1 and M2 are positive integers, and M1+M2=M. The N downlink reference signals include an SSB1, an SSB2, an SSB3, and an SSB4. As shown in FIG. 10, the SSB1 corresponds to a transmit beam 1, the SSB2 corresponds to a transmit beam 2, the SSB3 corresponds to a transmit beam 3, and the SSB4 corresponds to a transmit beam 4. By using an example in which the M CG resources may be M CG resources in one set of CG resources, in this case, a possible corresponding case is as follows. As shown in FIG. 13, a first CG resource in each periodicity (for example, a periodicity 1) of the set of CG resources corresponds to the SSB1, a second CG resource corresponds to the SSB2, and a third CG resource corresponds to the SSB3 and the SSB4. In addition, it can be learned that, compared with a correspondence shown in FIG. 11 or FIG. 12, a correspondence shown in FIG. 13 enables the terminal device to have better flexibility in selecting a CG resource.

It should be noted that, when configuring the M CG resources to correspond the N downlink reference signals, the access network device may separately use one of the corresponding manner 1, the corresponding manner 2, and the corresponding manner 3; or may use two or three corresponding manners in the corresponding manner 1, the corresponding manner 2, and the corresponding manner 3 in combination. In an example in which the access network device uses the corresponding manner 2 and the corresponding manner 3 in combination, for example, the M CG resources are CG resources in W sets of CG resources. For example, W=2, and the W sets of CG resources may include a first set of CG resources and a second set of CG resources. The M CG resources include CG resources in a periodicity i, a periodicity i+1, and a periodicity i+2 of the first set of CG resources, and CG resources in a periodicity j and a periodicity j+1 of the second set of CG resources. The N downlink reference signals include an SSB1, an SSB2, an SSB3, and an SSB4. In this case, a possible corresponding case is as follows. In the first set of CG resources, the periodicity i corresponds to the SSB1, the periodicity i+1 corresponds to the SSB2, and the periodicity i+2 corresponds to the SSB3 and the SSB4. In the second set of CG resources, first and second CG resources in the periodicity j correspond to the SSB1, a third CG resource in the periodicity j corresponds to the SSB2, and other CG resources (for example, fourth, fifth, and sixth CG resources in the periodicity j) in the periodicity j correspond to the SSB3 and the SSB4; and all CG resources in the periodicity j+1 correspond to the SSB1.

S903: The terminal device enters the RRC-non-connected state.

Herein, there may be a plurality of manners in which the terminal device enters the RRC-non-connected state. For example, the access network device may send an RRC connection release message to the terminal device, so that the terminal device may enter the RRC-non-connected state after receiving the RRC connection release message. For another example, when the terminal device is in a weak coverage area, if the signal receiving quality is poor and the RRC-connected state cannot be maintained, the terminal device may actively enter the non-connected state.

Optionally, in S904: The access network device sends P downlink reference signals, where the P downlink reference signals may include the N downlink reference signals.

For example, if one SS burst set includes four SSBs: an SSB1, an SSB2, an SSB3, and an SSB4, P may be equal to 4, and the P downlink reference signals include the SSB1, the SSB2, the SSB3, and the SSB4; and N may be a positive integer less than or equal to 4, and the N downlink reference signals include at least one of the SSB1, the SSB2, the SSB3, and the SSB4. For another example, if one SS burst set includes eight SSBs: an SSB1, an SSB2, and an SSB8, P may be equal to 8, and the P downlink reference signals include the SSB1, the SSB2, . . . , and the SSB8; and N may be a positive integer less than or equal to 8, and the N downlink reference signals include at least one of the SSB1, the SSB2, and the SSB8.

Optionally, in S905: The terminal device receives the P downlink reference signals, and measures the P downlink reference signals.

The terminal device may obtain measurement values of the P downlink reference signals by measuring the P downlink reference signals. A measurement value of each downlink reference signal may include at least one of the following: reference signal received power (RSRP), reference signal received quality (RSRQ), and a signal to interference plus noise ratio (SINK). This is not specifically limited.

Optionally, in S906: The terminal device sends the uplink data to the access network device on a CG resource corresponding to a downlink reference signal 1.

If it is determined that the uplink data needs to be sent, the terminal device may select, based on measurement values of the N downlink reference signals, the downlink reference signal 1 from the N downlink reference signals, and send the uplink data on the CG resource corresponding to the downlink reference signal 1.

For example, there may be a plurality of manners in which the terminal device selects, based on the measurement values of the N downlink reference signals, the downlink reference signal 1 from the N downlink reference signals. For example, the terminal device determines, based on the measurement values of the N downlink reference signals, one or more downlink reference signals (for example, the downlink reference signal 1 and a downlink reference signal 2) whose measurement values are greater than or equal to the first threshold in the N downlink reference signals, to select one downlink reference signal (for example, the downlink reference signal 1) from such downlink reference signals. The first threshold may be set according to an actual requirement, and this is not specifically limited. For another example, the terminal device selects, from the N downlink reference signals based on the measurement values of the N downlink reference signals, a downlink reference signal (for example, the downlink reference signal 1) with the largest measurement value.

Optionally, in S907: The access network device receives, by using a corresponding receive beam, the uplink data on the CG resource corresponding to the downlink reference signal 1.

By using the correspondence shown in FIG. 11 as an example, if the terminal device obtains, through measurement, that a measurement value of the SSB1 is highest or higher, the terminal device may send the uplink data on a CG resource corresponding to the SSB1, for example, select a CG resource (for example, a CG resource 1) from the first set of CG resources to send the uplink data. Correspondingly, after configuring the CG resource for the terminal device, the access network device may attempt to receive on the configured CG resource by using a corresponding beam. For example, the access network device may attempt to receive on the CG resource 1 by using a receive beam 1', so that the uplink data sent by the terminal device can be received. The receive beam 1' has a high correlation degree with the transmit beam 1.

If the terminal device obtains, through measurement, that a measurement value of the SSB2 is the highest or higher that a previous measurement, the terminal device may send the uplink data on a CG resource corresponding to the SSB2, for example, select a CG resource (for example, a CG resource 2) from the second set of CG resources to send the uplink data. Correspondingly, the access network device may attempt to receive on the CG resource 2 by using a receive beam 2', so that the uplink data sent by the terminal device can be received. The receive beam 2' has a high correlation degree with the transmit beam 2. For example, the receive beam 2' may be the same as or similar to the transmit beam 2.

If the terminal device obtains, through measurement, that a measurement value of the SSB3 (or the SSB4) is the highest or higher that a previous measurement, the terminal device may send the uplink data on a CG resource corresponding to the SSB3 (or the SSB4), for example, select a CG resource (for example, a CG resource 3) from the third set of CG resources to send the uplink data. Correspondingly, the access network device may attempt to receive on the CG resource 3 by using a receive beam 3', so that the uplink data sent by the terminal device can be received. The receive beam 3' has a high correlation degree with the transmit beam 3 and the transmit beam 4. Alternatively, the access network device may receive the uplink data on the CG resource 3 by using a receive beam 3$a$' or a receive beam 3$b$'. The receive beam 3$a$' has a high correlation degree with the transmit beam 3, and the receive beam 3$b$' has a high correlation degree with the transmit beam 4.

By using the correspondence shown in FIG. 12 as an example, if the terminal device obtains, through measurement, that a measurement value of the SSB1 is highest or higher, the terminal device may send the uplink data on a CG resource corresponding to the SSB1, for example, select a CG resource from the periodicity i of the first set of resources to send the uplink data, and/or select a CG resource from the periodicity j and/or the periodicity j+1 of the second set of resources to send the uplink data. Correspondingly, the access network device may attempt, by using a receive beam 1', to receive in the periodicity i of the first set of resources, the periodicity j of the second set of resources, and the periodicity j+1 of the second set of resources. Other cases are similar to the description in FIG. 11, and details are not described again.

By using the correspondence shown in FIG. 13 as an example, if the terminal device obtains, through measurement, that a measurement value of the SSB1 is highest or higher, the terminal device may send the uplink data on a CG resource corresponding to the SSB1, for example, select a first CG resource in a periodicity of the first set of resources to send the uplink data. Correspondingly, the access network device may attempt to receive on a first CG resource in each periodicity of the first set of resources by using a receive beam 1'. Other cases are similar to the description in FIG. 11, and details are not described again.

It should be noted that, a quantity of CG resources corresponding to different downlink reference signals in the N downlink reference signals may be the same or may be different. For example, the N downlink reference signals include a downlink reference signal 1 and a downlink reference signal 2, and a quantity of CG resources corresponding to the downlink reference signal 1 may be the same as or may be different from a quantity of CG resources corresponding to the downlink reference signal 2.

Further, when the terminal device is in the RRC-connected state, a serving beam may be maintained between the terminal device and the access network device through a beam management process. However, when the terminal device enters the RRC-non-connected state, there is a highest probability that the terminal device is within the coverage of the serving beam, and there is a low probability that the terminal device is within the coverage of another beam. Assuming that the serving beam is a beam corresponding to the downlink reference signal 1, when the terminal device is within the coverage of the serving beam, a measurement value of the downlink reference signal 1 obtained by the terminal device through measurement is usually the largest. Therefore, the quantity of CG resources corresponding to the downlink reference signal 1 may be set to be greater than or equal to a quantity of CG resources corresponding to another downlink reference signal in the N downlink reference signals. In this way, the terminal device can send uplink data by using a CG resource when the terminal device is in the RRC-non-connected state, thereby reducing space detection overheads of the access network device on the CG resource.

It may be understood that a quantity of CG resources corresponding to a downlink reference signal may include at least one of a quantity of sets, a quantity of periodicities, or a quantity of CG resources corresponding to the downlink reference signal. This is not specifically limited.

In the foregoing manner, the access network device may configure, for the terminal device, that the M CG resources correspond to the N downlink reference signals. Therefore, when the terminal device sends uplink data on a CG resource corresponding to a downlink reference signal, the access network device may receive the uplink data on the CG resource by using a corresponding receive beam, so that the receiving performance of the access network device can be effectively improved. According to still another aspect, when the access network device configures the M CG resources to correspond to the N downlink reference signals, the access network device may configure the correspondence based on a plurality of possible granularities, so that the terminal device has a high flexibility in selecting a CG resource, thereby facilitating data transmission in RRC non-connection state.

Embodiment 2

As described in Embodiment 1, the access network device may configure, for the terminal device, that the M CG resources correspond to the N downlink reference signals. However, because the terminal device is not stationary, after a period of time, the foregoing correspondence configured by the access network device for the terminal device may not be appropriate, affecting data transmission of the terminal device in an RRC-non-connected state.

For example, downlink reference signals sent by the access network device to the terminal device include a downlink reference signal 1 (corresponding to a transmit beam 1), a downlink reference signal 2 (corresponding to a transmit beam 2), a downlink reference signal 3 (corresponding to a transmit beam 3), and a downlink reference signal 4 (corresponding to a transmit beam 4). The access network device configures M1 CG resources to correspond to the downlink reference signal 1, M2 CG resources correspond to the downlink reference signal 2, M3 CG resources correspond to the downlink reference signal 3, and the downlink reference signal 4 does not correspond to a CG resource. For example, in a time period T1, the terminal device is within coverage of the transmit beam 1, and may further send uplink data to the access network device on the CG resources corresponding to the downlink reference signal 1. However, in a time period T2, the terminal device may move to coverage of the transmit beam 4. Because the downlink reference signal 4 does not correspond to the CG resource, the terminal device cannot send the uplink data by using the CG resource, affecting data transmission of the terminal device in the RRC-non-connected state.

Based on this, a communication method provided in Embodiment 2 of this application may include the following steps. A terminal device receives first configuration information from an access network device, where the first configuration information is for configuring M CG resources to correspond N downlink reference signals; and may receive first reconfiguration information from the access network device after the terminal device enters the non-connected state, where the first reconfiguration information is for updating downlink reference signals corresponding to some or all of the M CG resources. M and N are positive integers. In this way, the access network device may send the reconfiguration information to the terminal device, to update the downlink reference signals corresponding to some or all of the M CG resources. In this way, when the terminal device moves in an RRC-non-connected state, a correspondence between a CG resource and a downlink reference signal can be adjusted in a timely and flexible manner, to ensure data transmission of the terminal device in the RRC-non-connected state.

Figures 14, 15:
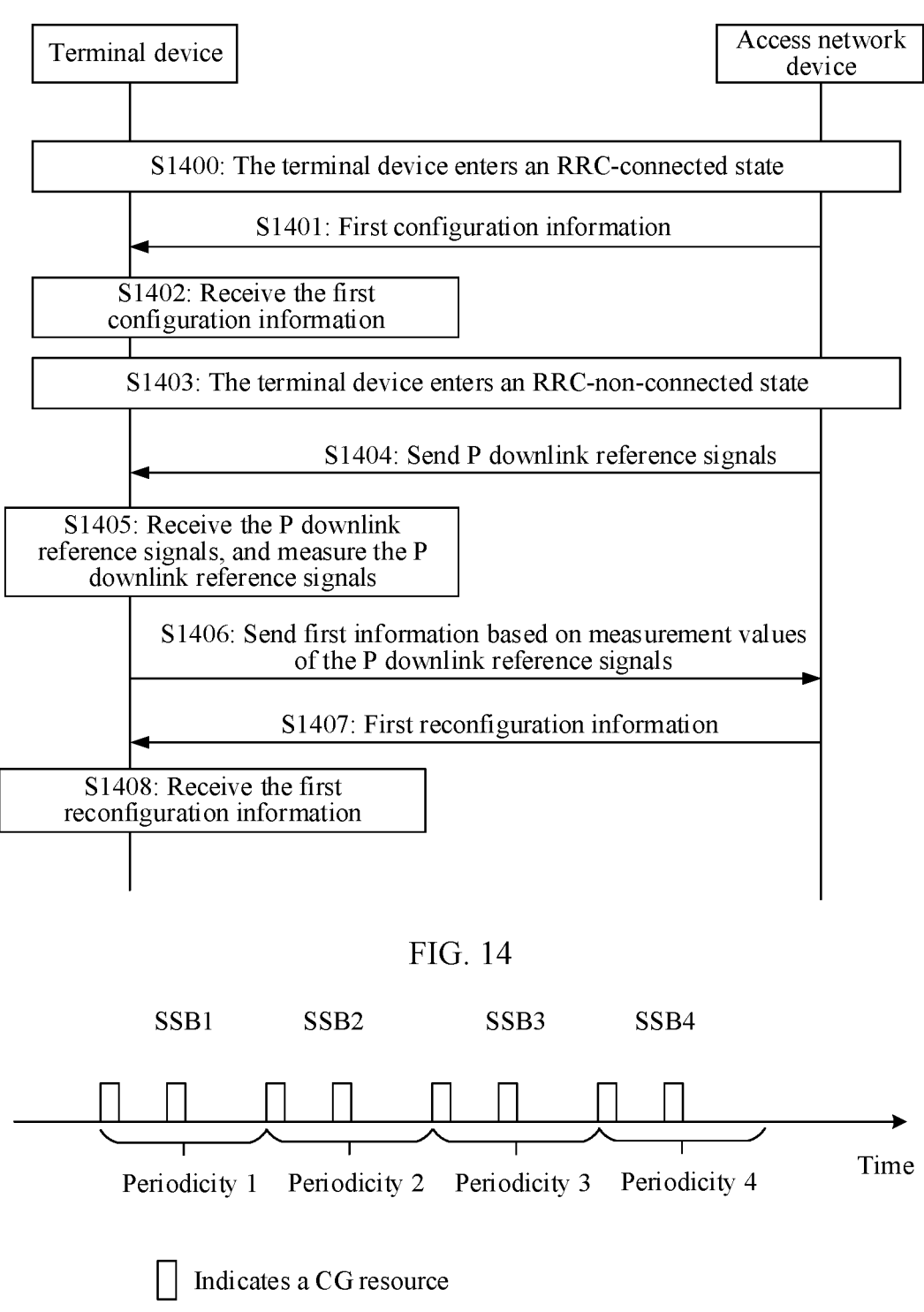
FIG. 14 is a schematic flowchart corresponding to a communication method according to Embodiment 2 of this application.
FIG. 15 is a schematic diagram of a correspondence between a CG resource and a downlink reference signal according to an embodiment of this application.

The following describes in detail the communication method provided in Embodiment 2 of this application with reference to FIG. 14.

FIG. 14 is a schematic flowchart corresponding to a communication method according to Embodiment 2 of this application. As shown in FIG. 14, the method includes the following steps.

Optionally, in S1400: A terminal device enters an RRC-connected state.

S1401: An access network device sends first configuration information to the terminal device, where the first configuration information is for configuring M CG resources to correspond N downlink reference signals.

Correspondingly, in S1402: The terminal device may receive the first configuration information from the access network device.

Optionally, in S1403: The terminal device enters an RRC-non-connected state.

Optionally, in S1404: The access network device sends P downlink reference signals, where the P downlink reference signals may include the N downlink reference signals.

Optionally, in S1405: The terminal device receives the P downlink reference signals, and measures the P downlink reference signals.

For specific implementations of S1400 to S1405, refer to Embodiment 1. Details are not described herein again.

Optionally, in S1406: The terminal device sends first information to the access network device based on measurement values of the P downlink reference signals.

The first information may be for requesting to update downlink reference signals corresponding to some or all of the M CG resources, or the first information may be for requesting to update a correspondence between a CG resource and a downlink reference signal. Alternatively, the first information may indicate measurement values of one or more downlink reference signals in the P downlink reference signals. Alternatively, the first information may indicate a sequence of measurement values of one or more downlink reference signals in the P downlink reference signals. Alternatively, the first information may indicate one or more downlink reference signals in the P downlink reference signals, where measurement values of the one or more downlink reference signals are greater than a measurement value of another reference signal, or measurement values of the one or more downlink reference signals are greater than or equal to a first threshold.

In some embodiments of this application, there may be a plurality of reasons for triggering the terminal device to send the first information to the access network device. For example, the P downlink reference signals include a first downlink reference signal and a second downlink reference signal, and further include other possible downlink reference signals. After the terminal device determines, based on the measurement values of the P downlink reference signals, that a measurement value of the second downlink reference signal is greater than measurement values of other downlink reference signals in the P reference signals (in other words, the measurement value of the second downlink reference signal in the P downlink reference signals is largest), if it is determined that at least one of the following Case 1 and Case 2 is met, the first information may be sent to the access network device. Case 1: The second downlink reference signal does not have a corresponding CG resource. In other words, the second downlink reference signal does not belong to the N downlink reference signals. Case 2: The quantity of CG resources corresponding to the second downlink reference signal is small. For example, the quantity of CG resources corresponding to the second downlink reference signal is less than the quantity of CG resources corresponding to another reference signal in the N downlink reference signals.

In some embodiments of this application, there may be a plurality of specific manners in which the terminal device sends the first information to the access network device. The following describes three possible implementations.

(1) Implementation 1: The Implementation May be Applicable to the Foregoing Case 1.

The terminal device may select, based on the measurement values of the N downlink reference signals, the first downlink reference signal from the N downlink reference signals, and send the first information to the access network device on a CG resource corresponding to the first downlink reference signal. Optionally, the terminal device may further send uplink data to the access network device on the CG resource corresponding to the first downlink reference signal. For a specific implementation in which the terminal device selects the first downlink reference signal from the N downlink reference signals, refer to the description in Embodiment 1.

In the implementation, the first information may include the measurement value of the first downlink reference signal and the measurement value of the second downlink reference signal. Alternatively, the first information may include an index of the second downlink reference signal (namely, an index of a downlink reference signal with a largest measurement value in the P downlink reference signals). Alternatively, the first information may include the measurement values of the P downlink reference signals. In this case, it may be understood that the terminal device requests to update the correspondence between the CG resource and the downlink reference signal in an explicit manner.

(2) Implementation 2: The Implementation May be Applicable to the Foregoing Case 1.

As described above, the access network device may indicate a correspondence between an SSB and a random access resource to the terminal device. Therefore, by using an example in which the downlink reference signal is an SSB, the terminal device may initiate a random access process based on a random access resource corresponding to the second downlink reference signal, and send the first information to the access network device in the random access process. For example, the first information is carried in a first message, and the first message is used in the random access process or the first message is transmitted in the random access process. If the random access process is a two-step random access process, the first message may be a MsgA. If the random access process is a four-step random access process, the first message may be a Msg1 or a Msg3. Optionally, the terminal device may further send uplink data to the access network device through the random access process, for example, send the uplink data by using the MsgA or the Msg3 in the random access process.

In the implementation, the first information may be a random access preamble. In this case, it may be understood that the terminal device requests to update the correspondence between the CG resource and the downlink reference signal in an implicit manner. Alternatively, the first information may include the measurement values of the P downlink reference signals. In this case, it may be understood that the terminal device requests to update the correspondence between the CG resource and the downlink reference signal in an explicit manner.

(3) Implementation 3: The Implementation May be Applicable to the Foregoing Case 2.

The terminal device may select, based on the measurement values of the N downlink reference signals, the second downlink reference signal from the N downlink reference signals, and send the first information to the access network device on a CG resource corresponding to the second downlink reference signal. Optionally, the terminal device may further send uplink data to the access network device on the CG resource corresponding to the second reference signal.

In the implementation, the first information may include the measurement values of the P downlink reference signals. In this case, it may be understood that the terminal device requests to update the correspondence between the CG resource and the downlink reference signal in an explicit manner.

It should be noted that, there may be a plurality of specific implementations in which the terminal device sends the first information on the CG resource. For example, the terminal device may send a PUCCH on the CG resource, where the PUCCH includes the first information, and the PUCCH may be reused on a PUSCH on the CG resource. For another example, the terminal device may send a MAC control element (CE) on the CG resource, where the MAC CE includes the first information. For another example, the terminal device may send an RRC message on the CG resource, where the RRC message includes the first information.

Optionally, in S1407: The access network device receives the first information, and sends first reconfiguration information to the terminal device, where the first reconfiguration information is for updating downlink reference signals corresponding to some or all of the M CG resources.

Correspondingly, in S1408: The terminal device may receive the first reconfiguration information.

For example, it is assumed that that a first CG resource corresponds to the first downlink reference signal is configured in the first configuration information. If the access network device receives the first information sent by the terminal device by using the foregoing Implementation 1, Implementation 2, or Implementation 3, the first reconfiguration information sent by the access network device may be for configuring the first CG resource to correspond to the second downlink reference signal. In this way, after receiving the first reconfiguration information, the terminal device may update the CG resource corresponding to the first downlink reference signal to a CG resource corresponding to the second downlink reference signal. Optionally, if that a second CG resource corresponds to the second downlink reference signal is also configured in the first configuration information, the first reconfiguration information may be further for configuring the second CG resource to correspond to the first downlink reference signal. In this way, after receiving the first reconfiguration information, the terminal device may further update the CG resource corresponding to the second downlink reference signal to a CG resource corresponding to the first downlink reference signal.

In addition, if the access network device receives the first information sent by the terminal device in the foregoing Implementation 1 or Implementation 3, the first reconfiguration information may be carried in DCI, a MAC CE, or an RRC message. In a possible implementation, the DCI may include second information, and the second information may include HARQ feedback information and/or scheduling information. The HARQ feedback information indicates whether the uplink data of the terminal device is successfully received (for example, the terminal device sends the uplink data to the access network device, and then the access network device may notify, by using the HARQ feedback information, the terminal device whether the uplink data is successfully received). The HARQ feedback information may be an acknowledgement (ACK) or a negative acknowledgement (NACK). The scheduling information may be for scheduling subsequent uplink and downlink transmission of the terminal device. For example, the scheduling information may be for scheduling a PUSCH or a PDSCH of the terminal device. If the access network device receives the first information sent by the terminal device in the foregoing Implementation 2, the first reconfiguration information may be carried in a second message, and the second message is used in the foregoing random access process or the second message is transmitted in the foregoing random access process. For example, the second message may be a MsgB in the random access process, or may be a Msg2 or a Msg4 in the random access process.

It should be noted that, the foregoing describes by using an example in which the first reconfiguration information is for updating downlink reference signals corresponding to some of the M CG resources. In another possible example, the first reconfiguration information may also be used for updating downlink reference signals corresponding to all of the M CG resources.

The following describes content that may be included in the first reconfiguration information with reference to several possible examples.

In an example, the M CG resources include a CG resource 1, a CG resource 2, a CG resource 3, and a CG resource 4, and the N downlink reference signals include an SSB1, an SSB2, an SSB3, and an SSB4. That the CG resource 1 corresponds to the SSB1, the CG resource 2 corresponds to the SSB2, the CG resource 3 corresponds to the SSB3, and the CG resource 4 corresponds to the SSB4 is configured in the first configuration information. In this case, the first reconfiguration information may include two bits, and values of the two bits indicate a quantity of cyclic shifts. For example, when the values of the two bits are "01", it indicates that one cyclic shift is performed. To be specific, the CG resource 1 corresponds to the SSB2, the CG resource 2 corresponds to the SSB3, the CG resource 3 corresponds to the SSB4, and the CG resource 4 corresponds to the SSB1. When the values of the two bits are "10", it indicates that two cyclic shifts are performed. To be specific, the CG resource 1 corresponds to the SSB3, the CG resource 2 corresponds to the SSB4, the CG resource 3 corresponds to the SSB1, and the CG resource 4 corresponds to the SSB2. For example, when the values of the two bits are "11", it indicates that three cyclic shifts are performed. To be specific, the CG resource 1 corresponds to the SSB4, the CG resource 2 corresponds to the SSB1, the CG resource 3 corresponds to the SSB2, and the CG resource 4 corresponds to the SSB3. In the manner, because the first reconfiguration information includes a small quantity of bits, the implementation is simple, and the downlink reference signals corresponding to a plurality of CG resources can be updated.

In still another example, for content included in the first reconfiguration information, refer to the content included in the first configuration information. A difference between the content included in the first reconfiguration information and the content included in the first configuration information is as follows: A downlink reference signal corresponding to a CG resource configured in the first reconfiguration information may be different from a downlink reference signal corresponding to a CG resource configured in the first configuration information.

In still another example, it is assumed that that a first CG resource corresponds to the first downlink reference signal is configured in the first configuration information. If the access network device receives the first information (namely, the first information sent by the terminal device on the first CG resource) sent by the terminal device by using the foregoing Implementation 1, the first reconfiguration information sent by the access network device may include an index of the second downlink reference signal, and the index of the second downlink reference signal indicates that a downlink reference signal corresponding to the first CG resource (or all CG resources corresponding to the first downlink reference signal) is updated to the second downlink reference signal.

It should be noted that, S1406 is an optional step. In other words, the terminal device may request, by sending the first information, the access network device to update the correspondence between the CG resource and the downlink reference signal. Then, the access network device sends, based on the request of the terminal device, the first reconfiguration information to the terminal device, to update the correspondence between the CG resource and the downlink reference signal.

Alternatively, the access network device may actively send the first reconfiguration information, to update the correspondence between the CG resource and the downlink reference signal. In this case, the terminal device may not need to send the first information to the access network device. For example, when the terminal device selects the second downlink reference signal and sends the uplink data to the access network device on the CG resource corresponding to the second downlink reference signal, if the access network device determines that a quantity of CG resources corresponding to the second downlink reference signal is small, the first reconfiguration information may be actively sent, to increase the CG resource corresponding to the second downlink reference signal. For another example, when the terminal device initiates the random access process based on a random access resource corresponding to the second downlink reference signal, the access network device may learn that the measurement value of the second downlink reference signal is the largest or larger than a previous measurement value, so that the first reconfiguration information may be actively sent, to increase the CG resource corresponding to the second downlink reference signal.

It may be understood that, after the access network device sends the first reconfiguration information to the terminal device, if the correspondence between the CG resource and the downlink reference signal needs to be updated again subsequently, the access network device may further send second reconfiguration information to the terminal device, to update the correspondence between the CG resource and the downlink reference signal.

In the foregoing manner, the access network device may send reconfiguration information to the terminal device, to update a correspondence between a CG resource and a downlink reference signal. In this way, when the terminal device moves in an RRC-non-connected state, the correspondence between the CG resource and the downlink reference signal can be adjusted in a timely and flexible manner, so that after selecting a current downlink reference signal, the terminal device can have more CG resources for sending uplink data, to ensure data transmission of the terminal device in the RRC-non-connected state.

Embodiment 3

As described in Embodiment 1 or Embodiment 2, the access network device may configure, for the terminal device, that the M CG resources correspond to the N downlink reference signals. Based on this, in Embodiment 3, a HARQ process identifier (HARQ process ID) corresponding to a CG resource is further studied.

Data transmission may be performed between the terminal device and the access network device by using a plurality of HARQ processes, to support parallel transmission of a plurality of data packets. It should be noted that, parallel transmission herein is not equivalent to simultaneous transmission. A HARQ process may include an entire process from initial transmission to when an ACK is finally received (in other words, information indicating that a receiver confirms that a data packet is correctly received is received), or include an entire process from initial transmission till a maximum quantity of times of retransmission is exceeded. Optionally, the two processes may include processes of receiving a NACK, sending retransmission, and the like. The entire process may be marked by using a HARQ process identifier. In this way, because HARQ process identifiers of initial transmission and retransmission are the same, a relationship between an initially transmitted data packet and a retransmitted data packet can be set up, thereby facilitating correct reception of the receiver. When a plurality of HARQ processes are used between the terminal device and the access network device, it means that there may be a plurality of such processes in parallel. In other words, when a HARQ process does not end, another HARQ process may be simultaneously performed.

In dynamic scheduling data transmission, the access network device may schedule a PUSCH/PDSCH by using DCI, where the DCI may include a field indicating a HARQ process identifier. For example, four bits may indicate the HARQ process identifier (where the HARQ process identifier ranges from 0 to 15), to mark a HARQ process identifier of a data packet transmitted on the PUSCH/PDSCH. However, in data transmission based on CG resources, there is no DCI for dynamic scheduling. Therefore, there is no method for dynamically determining a HARQ process identifier between the access network device and the terminal device. In this case, a manner for determining a HARQ process identifier is as follows: a HARQ process identifier of a data packet is determined based on a start time position (for example, a start symbol) of a CG resource that carries the data packet. Specifically, the HARQ process identifier of the data packet may be determined between the terminal device and the access network device by using the following formula:

$$\text{HARQ Process ID} = [\text{floor}(\text{CURRENT\_symbol}/\text{periodicity})] \bmod \text{nrofHARQ-Processes} + \text{harqProcID-Offset2}$$

$$\text{CURRENT\_symbol} = (\text{SFN} \times \text{numberOfSlotsPerFrame} \times \text{numberOfSymbolsPerSlot} + \text{slot number in the frame} \times \text{numberOfSymbolsPerSlot} + \text{symbol number in the slot})$$

For the definition of each parameter in the foregoing formula, refer to Table 1.

TABLE 1

|  | Meaning of each parameter |
| --- | --- |
| Parameter | Meaning corresponding to the parameter |
| floor | Round down |
| modulo | modulo operation |
| periodicity | Quantity of symbols included in each periodicity |
| nrofHARQ-Processes | Total quantity of HARQ processes, which may be configured by the access network device for the terminal device |
| harq-ProcID-Offset2 | The parameter is optional and can be configured by the access network device. Alternatively, the parameter may be agreed by a protocol. |
| SFN | Frame number of a system frame in which the start symbol of the CG resource that carries the data packet is |
| numberOfSlotsPerFrame | Quantity of slots included in each system frame |
| numberOfSymbolsPerSlot | Quantity of symbols included in each slot |
| slot number in the frame | Slot number of a slot in the system frame in which the start symbol of the CG resource that carries the data packet is |
| symbol number in the slot | Symbol number of the start symbol of the CG resource that carries the data packet in the slot |

In the foregoing manner for determining the HARQ process identifier, from a perspective of the CG resource, HARQ process identifier corresponding to CG resources in one periodicity are generally the same, and HARQ process identifier corresponding to CG resources in adjacent periodicities may be different.

For example, it is assumed that the access network device configures, for the terminal device, a set of CG resources and a correspondence between the set of CG resources and a downlink reference signal. The correspondence between the set of CG resources and the downlink reference signal is as follows: Refer to FIG. 15. An SSB1 corresponds to a periodicity 1, an SSB2 corresponds to a periodicity 2, an SSB3 corresponds to a periodicity 3, an SSB4 corresponds to a periodicity 4, the SSB1 corresponds to a periodicity 5, the SSB2 corresponds to a periodicity 6, the SSB3 corresponds to a periodicity 7, and the SSB4 corresponds to a periodicity 8. It is further assumed that each system frame includes 10 slots, each slot includes 14 symbols, a length of each periodicity is one slot, a frame number of a system frame in which a first CG resource in the periodicity 1 is included is 0, and a slot to which the first CG resource belongs is a slot 0, a start symbol to which the first CG resource belongs is 0, a total quantity of HARQ processes is 16, and a value of harq-ProcID-Offset2 is 0.

In this case, for a CG resource in the periodicity 1 (for example, the first CG resource in the periodicity 1), a corresponding HARQ process identifier may be obtained as follows:

CURRENT_symbol=(0*10*14+0*14+0)=0

HARQ Process ID=[floor(0/14)] modulo 16=0
modulo 16=0

For a CG resource in the periodicity 2 (for example, a first CG resource in the periodicity 2), a corresponding HARQ process identifier may be obtained as follows:

CURRENT_symbol=(0*10*14+1*14+0)=14

HARQ Process ID=[floor(14/14)] modulo 16=1
modulo 16=1

For a CG resource in the periodicity 3 (for example, a first CG resource in the periodicity 3), a corresponding HARQ process identifier may be obtained as follows:

CURRENT_symbol=(0*10*14+2*14+0)=28

HARQ Process ID=[floor(28/14)] modulo 16=2
modulo 16=2

For a CG resource in the periodicity 4 (for example, a first CG resource in the periodicity 4), a corresponding HARQ process identifier may be obtained as follows:

CURRENT_symbol=(0*10*14+3*14+0)=42

HARQ Process ID=[floor(42/14)] modulo 16=3
modulo 16=3

The rest is deduced by analogy.

For a CG resource in the periodicity 5, a corresponding HARQ process identifier may be obtained as follows: HARQ Process ID=4

For a CG resource in the periodicity 6, a corresponding HARQ process identifier may be obtained as follows: HARQ Process ID=5

For a CG resource in the periodicity 7, a corresponding HARQ process identifier may be obtained as follows: HARQ Process ID=6

For a CG resource in the periodicity 8, a corresponding HARQ process identifier may be obtained as follows: HARQ Process ID=7

However, in some possible scenarios, some problems may occur when the foregoing calculation manner for the HARQ process identifier is used. For example, in the foregoing example, it is assumed that measurement values of the SSB3 and the SSB4 in the SSB1 to the SSB4 are both greater than or equal to a first threshold, to be specific, the terminal device may send uplink data on a CG resource corresponding to the SSB3 or a CG resource corresponding to the SSB4. If the terminal device finds that a HARQ process whose HARQ Process ID is equal to 3 is available, because the HARQ process identifier corresponding to the CG resource in the periodicity 4 is 3, the terminal device can select to send the uplink data only on the CG resource corresponding to the SSB4. However, the uplink data cannot be sent on the CG resource corresponding to the SSB3. Therefore, selection of the CG resource by the terminal device is limited, and transmission delay of the uplink data is delayed.

Based on this, in Embodiment 3 of this application, for a CG resource in the M CG resources, a HARQ process identifier corresponding to the CG resource may be obtained based on a first offset, and the first offset may be determined based on a downlink reference signal corresponding to the CG resource. For example, the first offset may be configured by the access network device for the downlink reference signal corresponding to the CG resource.

In an example, the HARQ process identifier corresponding to the CG resource may be determined by using the following formula:

$$\text{HARQ Process ID} = [\text{floor}(\text{CURRENT\_symbol}/\text{periodicity})] \text{ modulo nrofHARQ-Processes} + \text{harq-ProcID-Offset2} + \text{harq-ProcID-offset-forSSB-n}$$

harq-ProcID-offset-forSSB-n is the first offset.

For example, in the foregoing example, an offset 1, an offset 2, an offset 3, and an offset 4 are introduced. The offset 1 may be determined based on the SSB1, for example, the offset 1=3. The offset 2 may be determined based on the SSB2, for example, the offset 2=2. The offset 3 may be determined based on the SSB3, for example, the offset 3=1. The offset 4 may be determined based on the SSB4, for example, the offset 4=0. In this case:

For a CG resource in the periodicity 1, a corresponding HARQ process identifier may be obtained as follows: HARQ Process ID=3

For a CG resource in the periodicity 2, a corresponding HARQ process identifier may be obtained as follows: HARQ Process ID=3

For a CG resource in the periodicity 3, a corresponding HARQ process identifier may be obtained as follows: HARQ Process ID=3

For a CG resource in the periodicity 4, a corresponding HARQ process identifier may be obtained as follows: HARQ Process ID=3

In this way, when the terminal device may send the uplink data on the CG resource corresponding to the SSB3 or the CG resource corresponding to the SSB4, if the terminal device finds that a HARQ process whose HARQ Process ID is equal to 3 is available, the terminal device may select to send the uplink data on the CG resource corresponding to the SSB3, or may select to send the uplink data on the CG resource corresponding to the SSB4, thereby increasing a quantity of CG resources corresponding to a HARQ process identifier. In other words, selection opportunities of the terminal device are increased, thereby facilitating reducing a transmission delay of the uplink data.

Further, when the terminal device sends an initially transmitted data packet by using a HARQ process and does not receive an ACK fed back by the access network device, the terminal device may perform retransmission one or more times by using the HARQ process. To avoid a resource waste caused by excessive retransmission by the terminal device, in Embodiment 3 of this application, the access network device may send second configuration information to the terminal device, where the second configuration information is for configuring a maximum quantity of times of retransmission of a HARQ process corresponding to the HARQ process identifier and/or a valid duration of the HARQ process corresponding to the HARQ process identifier. There may be a plurality of manners in which the access network device sends the second configuration information to the terminal device. This is not limited in embodiments of this application. For example, the access network device may send the first configuration information and the second configuration information to the terminal device by using a same message. In this way, for a HARQ process identifier, after the terminal device finds that a quantity of times of retransmission of a HARQ process corresponding to the HARQ process identifier reaches the maximum quantity of times of retransmission or the duration of a HARQ process corresponding to the HARQ process identifier reaches the valid duration, the terminal device may discard the HARQ process. Optionally, the terminal device may initiate a random access process to the access network device to enter an RRC-connected state, or perform data transmission based on random access.

For Embodiment 1 to Embodiment 3, it should be noted that:

(1) Embodiment 1 and Embodiment 2 may be separately implemented, and Embodiment 3 may be implemented in combination with Embodiment 1, or may be implemented in combination with Embodiment 2.

(2) The foregoing focuses on differences among Embodiment 1 to Embodiment 3. For similar content, Embodiment 1 to Embodiment 3 may be interchangeably referenced.

(3) Step numbers of the flowcharts described in Embodiment 1 to Embodiment 2 are merely examples of performing the procedure, and do not constitute a limitation on a sequence of performing the steps. In embodiments of this application, there is no strict execution sequence among steps that do not have a time sequence dependency on each other. In addition, not all the steps shown in the flowcharts are mandatory steps, and some steps may be added to or deleted from the flowcharts based on an actual requirement.

The foregoing mainly describes the solutions provided in embodiments of this application from the perspective of data exchange between the access network device and the terminal device. It may be understood that, to implement the foregoing functions, the terminal device may include corresponding hardware structures and/or software modules for performing the functions. A person skilled in the art should be easily aware that, in embodiments of this application, the units and algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, the terminal device may be divided into functional units based on the foregoing method examples. For example, each functional unit may be obtained through division based on each corresponding function, or two or more functions may be integrated into one unit. The integrated unit may be implemented in a form of hardware, or may be implemented in a form of a software function unit running on a hardware platform.

Figure 16:
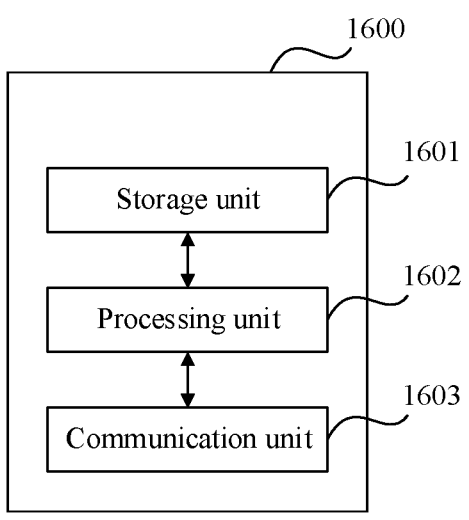
FIG. 16 is a possible schematic block diagram of an apparatus according to an embodiment of this application.

When the integrated unit is used, FIG. 16 is a possible schematic block diagram of an apparatus according to an embodiment of this application. As shown in FIG. 16, an apparatus 1600 may include: a processing unit (e.g., processing circuit or circuits) 1602 and a communication unit (communication device or circuit(s)) 1603. The processing unit 1602 is configured to control and manage an action of the apparatus 1600. The communication unit 1603 is configured to support communication between the apparatus 1600 and another device. Optionally, the communication unit 1603 is also referred to as a transceiver unit, and may include a receiving unit (e.g., receiving circuit or circuits) and/or a sending unit (e.g., sending circuit or circuits), respectively configured to perform a receiving operation and a sending operation. The apparatus 1600 may further include a storage unit 1601 configured to store program code and/or data of the apparatus 1600.

The apparatus 1600 may be the terminal device in the foregoing embodiment, or may be a chip disposed in the terminal device. The processing unit 1602 may support the apparatus 1600 in performing actions of the terminal device in the foregoing method examples. Alternatively, the processing unit 1602 mainly performs an internal action of the terminal device in the method examples, and the communication unit 1603 may support communication between the apparatus 1600 and another device.

Details are as follows. In an embodiment, the communication unit 1603 is configured to: receive first configuration information from an access network device, where the first configuration information is for configuring M configured grant (CG) resources to correspond N downlink reference signals, and the M CG resources are used by the terminal device to send uplink information when the terminal device is in a non-connected state; and receive first reconfiguration information from the access network device after the terminal device enters the non-connected state, where the first reconfiguration information is for updating downlink reference signals corresponding to some or all of the M CG resources. M and N are positive integers.

The apparatus 1600 may be the access network device in the foregoing embodiment, or may be a chip disposed in the access network device. The processing unit 1602 may support the apparatus 1600 in performing actions of the access network device in the foregoing method examples. Alternatively, the processing unit 1602 mainly performs an internal action of the access network device in the method examples, and the communication unit 1603 may support communication between the apparatus 1600 and another device.

Specifically, in an embodiment, the communication unit 1603 is configured to: send first configuration information to a terminal device, where the first configuration information is for configuring M configured grant (CG) resources to correspond N downlink reference signals, and the M CG resources are for receiving uplink information from the terminal device when the terminal device is in a non-connected state; and send first reconfiguration information to the terminal device after the terminal device enters the non-connected state, where the first reconfiguration information is for updating downlink reference signals corresponding to some or all of the M CG resources. M and N are positive integers.

It should be understood that division into units in the apparatus is merely logical function division. During actual implementation, all or some of the units may be integrated into one physical entity or may be physically separated. In addition, the units in the apparatus entirely implemented in a form of invoking software through processing elements; or may be entirely implemented in a form of hardware; or some units may be implemented in a form of invoking software through processing elements, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, operations in the foregoing methods or the foregoing units may be implemented by using a hardware integrated logic circuit in a processor element, or may be implemented in a form in which the processing element invokes software.

In an example, any one of the foregoing units in the apparatus may be one or more integrated circuits configured to implement the foregoing methods, for example, one or more application specific integrated circuits (ASICs), one or more microprocessors (DSPs), or one or more field programmable gate arrays (FPGAs), or a combination of at least two of these integrated circuit forms. For another example, when the units in the apparatus may be implemented in a form in which a processing element schedules a program, the processing element may be a processor, for example, a general-purpose central processing unit (CPU) or another processor that can invoke the program. For still another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 17:
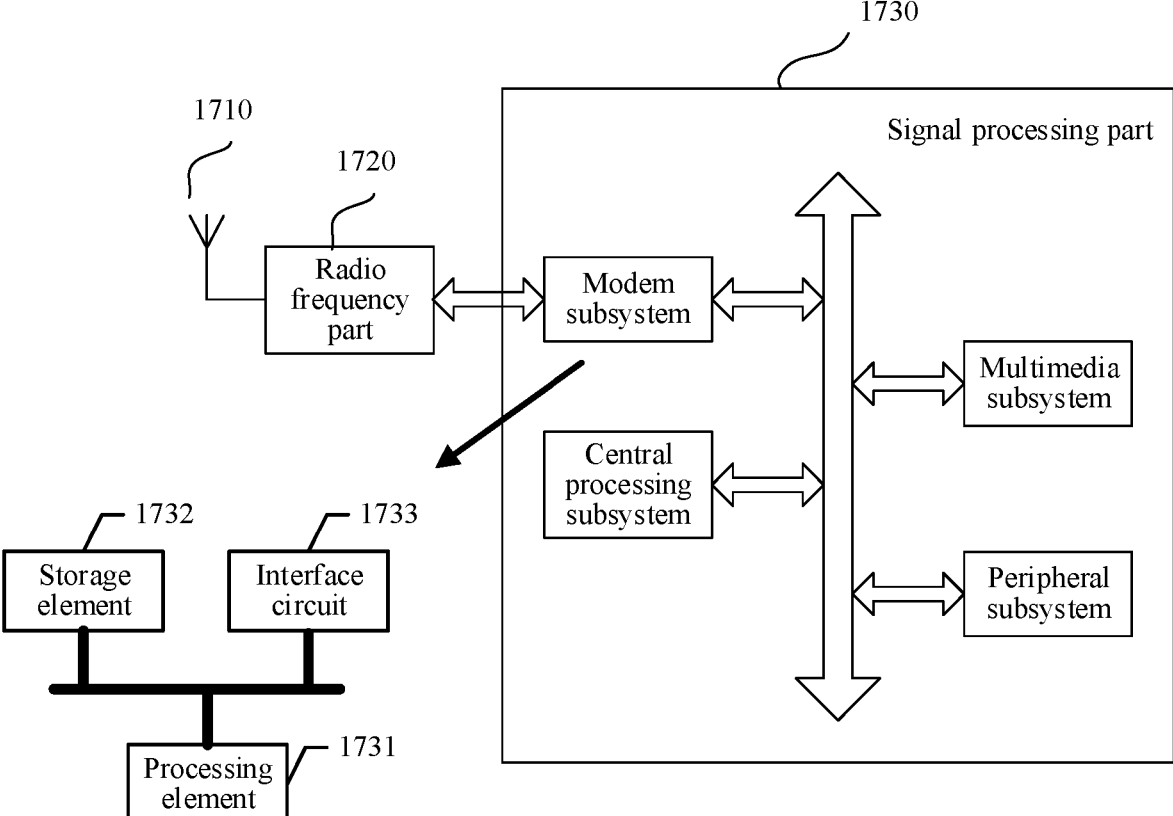
FIG. 17 is a schematic diagram of a structure of a terminal device according to an embodiment of this application.

FIG. 17 is a schematic diagram of a structure of a terminal device according to an embodiment of this application. The terminal device may be the terminal device in the foregoing embodiments, and is configured to implement operations of the terminal device in the foregoing embodiments. As shown in FIG. 17, the terminal device includes: an antenna 1710, a radio frequency part 1720, and a signal processing part 1730. The antenna 1710 is connected to the radio frequency part 1720. In a downlink direction, the radio frequency part 1720 receives information sent by a network device by using the antenna 1710, and sends the information sent by the network device to the signal processing part 1730 for processing. In an uplink direction, the signal processing part 1730 processes the information of the terminal device, and sends the information to the radio frequency part 1720. The radio frequency part 1720 processes the information of the terminal device, and then sends the information to the network device by using the antenna 1710.

The signal processing part 1730 may include a modem subsystem configured to process each communication protocol layer of data; may further include a central processing subsystem configured to process an operating system and an application layer of the terminal device; and in addition, may further include other subsystems, for example, a multimedia subsystem and a peripheral subsystem. The multimedia subsystem is configured to control a camera and a screen display of the terminal device, and the peripheral subsystem is configured to connect to another device. The modem subsystem may be a separately disposed chip.

The modem subsystem may include one or more processing elements 1731, for example, include a main control CPU and another integrated circuit. In addition, the modem subsystem may further include a storage element 1732 and an interface circuit 1733. The storage element 1732 is configured to store data and a program. However, a program used to perform the method performed by the terminal device in the foregoing method may not be stored in the storage element 1732, but is stored in a memory outside the modem subsystem, and is loaded and used by the modem subsystem when to be used. The interface circuit 1733 is configured to communicate with another subsystem.

The modem subsystem may be implemented by using a chip. The chip includes at least one processing element and an interface circuit. The processing element is configured to perform steps of any method performed by the terminal device, and the interface circuit is configured to communicate with another apparatus. In an implementation, units used by the terminal device to implement the steps in the foregoing method may be implemented in a form of scheduling a program by a processing element. For example, an apparatus for the terminal device includes a processing element and a storage element, and the processing element invokes a program stored in the storage element, to perform the method performed by the terminal device in the foregoing method embodiments. The storage element may be a storage element located on a same chip as the processing element, namely, an on-chip storage element.

In another implementation, the program invoked to perform the method performed by the terminal device in the foregoing method may be stored in a storage element located on a chip different from that of the processing element, namely, an off-chip storage element. In this case, the processing element invokes or loads a program in the on-chip storage element from the off-chip storage element, to invoke and perform the method performed by the corresponding terminal device in the foregoing method embodiments.

In an implementation, units used by the terminal device to implement the steps in the foregoing method may be configured as one or more processing elements, the processing elements may be disposed on the modem subsystem, and the processing elements herein may be integrated circuits, for example, one or more ASICs, one or more DSPs, one or more FPGAs, or a combination of these integrated circuits. The integrated circuits may be integrated together to form a chip.

The units used by the terminal device to implement the steps in the foregoing method may be integrated together, and implemented in a form of an SOC. The SOC chip is configured to implement the foregoing method. At least one processing element and a storage element may be integrated in the chip, and the processing element invokes a program stored in the storage element to implement the foregoing method performed by the terminal device. Alternatively, at least one integrated circuit may be integrated in the chip, and is configured to implement the method performed by the foregoing terminal device. Alternatively, with reference to the foregoing implementations, functions of some units are implemented in a form of a program invoked by a processing element, and functions of some units are implemented in a form of an integrated circuit.

It can be learned that the foregoing apparatus for the terminal device may include at least one processing element and an interface circuit, where the at least one processing element is configured to perform any method performed by the terminal device provided in the foregoing method embodiments. The processing element may be in a first manner. In other words, some or all of the steps performed by the terminal device are executed in a manner of invoking the program stored in the storage element. Alternatively, the processing element may be in a second manner. In other words, some or all of the steps performed by the terminal device are executed by using an integrated logic circuit of hardware in a processor element in combination with instructions. Certainly, some or all of the steps performed by the terminal device may also be performed with reference to the first manner and the second manner.

The processing element herein is the same as that described above, and may be implemented by using a processor. A function of the processing element may be the same as a function of the processing unit described in FIG. 16. For example, the processing element may be a general purpose processor, for example, a CPU, or may be one or more integrated circuits configured to implement the foregoing method, for example, one or more ASICs, one or more microprocessors (DSPs), one or more FPGAs, or a combination of at least two of these integrated circuit forms. The storage element may be implemented by using a memory. A function of the storage element may be the same as a function of the storage unit described in FIG. 16. The storage element may be one memory, or may be a collective name of a plurality of memories.

The terminal device shown in FIG. 17 can implement all processes of the terminal device in the foregoing method embodiments. Operations and/or functions of all modules in the terminal device shown in FIG. 17 are respectively for implementing corresponding procedures in the foregoing method embodiments. For details, refer to the descriptions in the foregoing method embodiments. To avoid repetition, detailed descriptions are appropriately omitted herein.

Figure 18:
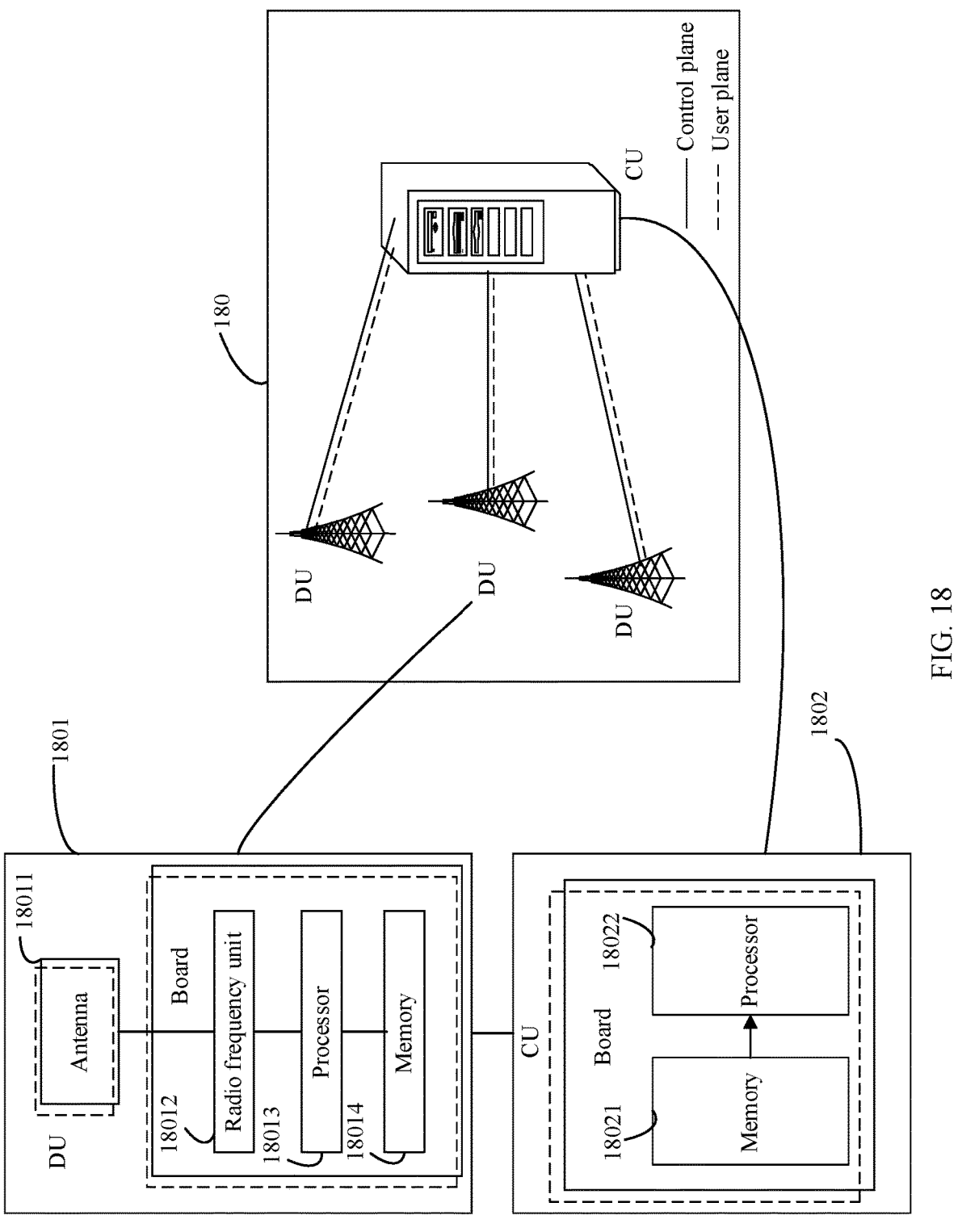
FIG. 18 is a schematic diagram of a structure of an access network device according to an embodiment of this application.

FIG. 18 is a schematic diagram of a structure of an access network device according to an embodiment of this application. The access network device (or a base station) may be used in the system architecture shown in FIG. 1, to perform functions of the access network device in the foregoing method embodiments. The access network device 180 may include one or more DUs 1801 and one or more CUs 1802. The DU 1801 may include at least one antenna 18011, at least one radio frequency unit 18012, at least one processor 18013, and at least one memory 18014. The DU 1801 is mainly configured to receive and send a radio frequency signal, perform conversion between a radio frequency signal and a baseband signal, and perform partial baseband processing. The CU 1802 may include at least one processor 18022 and at least one memory 18021.

The CU 1802 is configured to perform baseband processing, control the access network device, and the like. The DU 1801 and the CU 1802 may be physically disposed together, or may be physically separated, that is, the base station is a distributed base station. The CU 1802 is a control center of the access network device, may also be referred to as a processing unit, and is mainly configured to complete a baseband processing function. For example, the CU 1802 may be configured to control the access network device to perform operation procedures related to the access network device in the foregoing method embodiments.

In addition, optionally, the access network device 180 may include one or more radio frequency units, one or more DUs, and one or more CUs. The DU may include at least one processor 18013 and at least one memory 18014, the radio frequency unit may include at least one antenna 18011 and at least one radio frequency unit 18012, and the CU may include at least one processor 18022 and at least one memory 18021.

In an instance, the CU 1802 may include one or more boards. A plurality of boards may jointly support a radio access network (for example, a 5G network) with a single access indication, or may separately support radio access networks (for example, an LTE network, a 5G network, or another network) with different access standards. The memory 18021 and the processor 18022 may serve one or more boards. In other words, a memory and a processor may be deployed on each board. Alternatively, a plurality of boards may share a same memory and a same processor. In addition, a necessary circuit may be further disposed on each board. The DU 1801 may include one or more boards. A plurality of boards may jointly support a radio access network (for example, a 5G network) with a single access indication, or may separately support radio access networks (for example, an LTE network, a 5G network, or another network) with different access standards. The memory 18014 and the processor 18013 may serve one or more boards. In other words, a memory and a processor may be deployed on each board. Alternatively, a plurality of boards may share a same memory and a same processor. In addition, a necessary circuit may be further disposed on each board.

The access network device shown in FIG. 18 can implement all processes of the access network device in the foregoing method embodiments. Operations and/or functions of all modules in the access network device shown in FIG. 18 are respectively for implementing corresponding procedures in the foregoing method embodiments. For details, refer to the descriptions in the method embodiments. To avoid repetition, details are properly omitted herein.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can guide the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operation steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
receiving first configuration information from an access network device, wherein the first configuration information is for configuring M configured grant (CG) resources to correspond to N downlink reference signals, and the M CG resources are used by a terminal device to send uplink information when the terminal device is in a non-connected state;
receiving, at the terminal device, P downlink reference signals including the N downlink reference signals, and performing measurements of the P downlink reference signals;
transmitting, by the terminal device and based on the measurements, first information to the access network device, the first information indicating at least one downlink reference signal among the P downlink reference signals; and
receiving first reconfiguration information from the access network device when the terminal device is in the non-connected state, wherein the first reconfiguration information is for updating a correspondence between at least one of the M CG resources and the at least one downlink reference signal indicated by the first information, wherein
M, P and N are positive integers.

2. The method according to claim 1, wherein that the M CG resources correspond to N downlink reference signals comprises at least one of the following:
the M CG resources belong to one or more sets of CG resources, each CG resource belongs to one of the one or more sets of CG resources, and each set of CG resources corresponds to one or more downlink reference signals in the N downlink reference signals;
the M CG resources are in one or more periodicities, each CG resource is in one of the periodicities, and each periodicity corresponds to one or more downlink reference signals in the N downlink reference signals; or
one or more CG resources in the M CG resources correspond to one or more downlink reference signals in the N downlink reference signals.

3. The method according to claim 1, wherein the N downlink reference signals comprise a first downlink reference signal; and
the method further comprises:
sending first information to the access network device on a CG resource corresponding to the first downlink reference signal.

4. The method according to claim 3, wherein the method further comprises:
sending uplink data to the access network device on the CG resource corresponding to the first downlink reference signal.

5. The method according to claim 3, wherein a measurement value of the first downlink reference signal is greater than or equal to a first threshold; or a measurement value of the first downlink reference signal is greater than or equal to measurement values of other downlink reference signals in the N downlink reference signals.

6. The method according to claim 3, wherein the P downlink reference signals comprise a second downlink reference signal, and a measurement value of the second downlink reference signal is greater than the measurement value of the first downlink reference signal; and the first information comprises the measurement value of the first downlink reference signal and the measurement value of the second downlink reference signal; or the first information comprises an index of the second downlink reference signal; or the first information comprises measurement values of the P downlink reference signals.

7. The method of claim 1, wherein the correspondence between at least one of the M CG resources and the at least one downlink reference signal is determined based on a granularity of one of: a CG resource set, a periodicity, or a quantity of CG resources.

8. An apparatus, comprising:

one or more processors; and a memory having instructions stored thereon that, when executed by the one or more processors, cause the apparatus to:

receive first configuration information from an access network device, wherein the first configuration information is for configuring M configured grant (CG) resources to correspond to N downlink reference signals, and the M CG resources are used by a terminal device to send uplink information when the terminal device is in a non-connected state;

receive, at the terminal device, P downlink reference signals including the N downlink reference signals, and perform measurements of the P downlink reference signals;

transmit, by the terminal device and based on the measurements, first information to the access network device, the first information indicating at least one downlink reference signal among the P downlink reference signals; and receive first reconfiguration information from the access network device when the terminal device is in the non-connected state, wherein the first reconfiguration information is for updating a correspondence between at least one of the M CG resources and the at least one downlink reference signal indicated by the first information, wherein M, P and N are positive integers.

9. The apparatus according to claim 8, wherein the M CG resources belong to one or more sets of CG resources, each CG resource belongs to one of the one or more sets of CG resources, and each set of CG resources corresponds to one or more downlink reference signals in the N downlink reference signals;

the M CG resources are in one or more periodicities, each CG resource is in one of the periodicities, and each periodicity corresponds to one or more downlink reference signals in the N downlink reference signals; or one or more CG resources in the M CG resources correspond to one or more downlink reference signals in the N downlink reference signals.

10. The apparatus according to claim 8, wherein the N downlink reference signals comprise a first downlink reference signal; and the apparatus is further caused to:

send first information to the access network device on a CG resource corresponding to the first downlink reference signal.

11. The apparatus according to claim 10, wherein the apparatus is further caused to:

send uplink data to the access network device on the CG resource corresponding to the first downlink reference signal.

12. The apparatus according to claim 10, wherein a measurement value of the first downlink reference signal is greater than or equal to a first threshold; or a measurement value of the first downlink reference signal is greater than or equal to measurement values of other downlink reference signals in the N downlink reference signals.

13. The apparatus according to claim 10, wherein the P downlink reference signals comprise a second downlink reference signal, and a measurement value of the second downlink reference signal is greater than the measurement value of the first downlink reference signal; and the first information comprises the measurement value of the first downlink reference signal and the measurement value of the second downlink reference signal; or the first information comprises an index of the second downlink reference signal; or the first information comprises measurement values of the P downlink reference signals.

14. The apparatus according to claim 8, wherein the correspondence between at least one of the M CG resources and the at least one downlink reference signal is determined based on a granularity of one of: a CG resource set, a periodicity, or a quantity of CG resources.

15. A non-transitory computer readable medium storing instructions that are executable by a computer, the non-transitory computer readable medium is applied to a first communication apparatus, and the instructions comprise instructions for:

receiving first configuration information from an access network device, wherein the first configuration information is for configuring M configured grant (CG) resources to correspond to N downlink reference signals, and the M CG resources are used by a terminal device to send uplink information when the terminal device is in a non-connected state;

receive, at the terminal device, P downlink reference signals including the N downlink reference signals, and perform measurements of the P downlink reference signals;

transmit, by the terminal device and based on the measurements, first information to the access network device, the first information indicating at least one downlink reference signal among the P downlink reference signals; and receiving first reconfiguration information from the access network device when the terminal device is in the non-connected state, wherein the first reconfiguration information is for updating a correspondence between at least one of the M CG resources and the at least one downlink reference signal indicated by the first information, wherein M, P and N are positive integers.

16. The non-transitory computer readable medium according to claim 15, wherein that the M CG resources correspond to N downlink reference signals comprises at least one of the following:

the M CG resources belong to one or more sets of CG resources, each CG resource belongs to one of the one or more sets of CG resources, and each set of CG resources corresponds to one or more downlink reference signals in the N downlink reference signals;

the M CG resources are in one or more periodicities, each CG resource is in one of the periodicities, and each periodicity corresponds to one or more downlink reference signals in the N downlink reference signals; or one or more CG resources in the M CG resources correspond to one or more downlink reference signals in the N downlink reference signals.

17. The non-transitory computer readable medium according to claim 15, wherein the N downlink reference signals comprise a first downlink reference signal; and the instructions further comprise instructions for:

sending first information to the access network device on a CG resource corresponding to the first downlink reference signal.

18. The non-transitory computer readable medium according to claim 17, wherein the instructions further comprise instructions for:

sending uplink data to the access network device on the CG resource corresponding to the first downlink reference signal.

19. The non-transitory computer readable medium according to claim 17, wherein the P downlink reference signals comprise a second downlink reference signal, and a measurement value of the second downlink reference signal is greater than the measurement value of the first downlink reference signal; and the first information comprises the measurement value of the first downlink reference signal and the measurement value of the second downlink reference signal; or the first information comprises an index of the second downlink reference signal; or the first information comprises measurement values of the P downlink reference signals.

20. The non-transitory computer readable medium according to claim 15, wherein the correspondence between at least one of the M CG resources and the at least one downlink reference signal is determined based on a granularity of one of: a CG resource set, a periodicity, or a quantity of CG resources.

* * * * *